(12) United States Patent
Fujita

(10) Patent No.: US 10,983,198 B2
(45) Date of Patent: Apr. 20, 2021

(54) OBJECTIVE SENSOR, OBJECTIVE SENSOR DIRT DETERMINATION METHOD, AND OBJECT DETECTION DEVICE

(71) Applicant: KONICA MINOLTA, INC., Tokyo (JP)

(72) Inventor: Junichi Fujita, Saitama (JP)

(73) Assignee: KONICA MINOLTA, INC., Tokyo (JP)

(*) Notice: Subject to any disclaimer, the term of this patent is extended or adjusted under 35 U.S.C. 154(b) by 615 days.

(21) Appl. No.: 15/739,423

(22) PCT Filed: Jun. 7, 2016

(86) PCT No.: PCT/JP2016/066831
§ 371 (c)(1),
(2) Date: Dec. 22, 2017

(87) PCT Pub. No.: WO2016/208373
PCT Pub. Date: Dec. 29, 2016

(65) Prior Publication Data
US 2018/0188362 A1    Jul. 5, 2018

(30) Foreign Application Priority Data

Jun. 24, 2015    (JP) .............................. JP2015-126708

(51) Int. Cl.
*G01S 7/497* (2006.01)
*G01S 17/46* (2006.01)
(Continued)

(52) U.S. Cl.
CPC .............. *G01S 7/497* (2013.01); *G01S 17/42* (2013.01); *G01S 17/46* (2013.01); *G01S 17/931* (2020.01);
(Continued)

(58) Field of Classification Search
CPC ........ G01S 17/931; G01S 17/42; G01S 17/46; G01S 201/9323; G01S 2007/4975
See application file for complete search history.

(56) References Cited

U.S. PATENT DOCUMENTS 7,271,880 B2 * 9/2007 Samukawa ............. G01S 7/497
356/4.01
7,538,310 B2 * 5/2009 Yamada ................ G01S 7/4817
250/221

(Continued)

FOREIGN PATENT DOCUMENTS

JP    H04317510 A    11/1992
JP    H05072146 A    3/1993
(Continued)

OTHER PUBLICATIONS

JPO Notice of Reasons for Refusal corresponding to Application No. 2017-525147; dated Jun. 4, 2019.
(Continued)

*Primary Examiner* — Yuqing Xiao
*Assistant Examiner* — Amir J Askarian
(74) *Attorney, Agent, or Firm* — Cantor Colburn LLP

(57) ABSTRACT

An objective sensor, a dirt determination method thereof, and an object detection device according to the present invention, individually transmit transmission waves in a plurality of mutually different directions and receive the respective reflected wave thereof, through a protective member, so as to measure, with the plurality of directions as a plurality of measurement points, a transmission and reception time and the intensity of the reflected wave for each of the plurality of measurement points. Then, the objective sensor, the dirt determination method thereof, and the object detection device extract, as dirt candidate points, the measurement points each having the transmission and reception time shorter than a first threshold time and the intensity (Continued)

equivalent to or more than threshold intensity, regard the dirt candidate points that have been extracted, as the dirt points in a case where the dirt candidate points continue for a second threshold time or more, and acquire the dirt point distributions on the basis of the dirt points. Then, the presence or absence of dirt on the protective member is determined, on the basis of the dirt point distributions that have been acquired.

9 Claims, 11 Drawing Sheets

(51) Int. Cl.
  *G01S 17/931* (2020.01)
  *G01S 17/42* (2006.01)
  *G01S 13/931* (2020.01)
(52) U.S. Cl.
  CPC ............... *G01S 2007/4975* (2013.01); *G01S 2013/9323* (2020.01); *G01S 2013/9324* (2020.01)

(56) References Cited

U.S. PATENT DOCUMENTS

| | | | | |
|---|---|---|---|---|
| 7,755,534 B2* | 7/2010 | Samukawa | ............ | H01Q 21/06 342/104 |
| 8,681,323 B2* | 3/2014 | Iwasawa | ................. | G01S 17/42 356/5.01 |
| 9,319,637 B2* | 4/2016 | Lu | ......................... | H04N 5/2171 |
| 9,445,057 B2* | 9/2016 | May | .......................... | G06T 7/20 |
| 2007/0021915 A1* | 1/2007 | Breed | .................... | G08G 1/164 701/301 |
| 2009/0092284 A1* | 4/2009 | Breed | .................... | B60N 2/002 382/103 |
| 2010/0067324 A1* | 3/2010 | Preissler | ............. | G01S 7/52004 367/13 |
| 2010/0209882 A1* | 8/2010 | Lin | ....................... | G09B 19/167 434/65 |
| 2011/0181865 A1* | 7/2011 | Fukuhara | .................. | G01D 5/30 356/28 |
| 2011/0205521 A1* | 8/2011 | Mimeault | ............... | G01S 17/42 356/4.01 |

FOREIGN PATENT DOCUMENTS

| | | |
|---|---|---|
| JP | 2004245720 A | 9/2004 |
| JP | 3915742 B2 | 5/2007 |
| JP | 2011022080 A | 2/2011 |
| JP | 2012053049 A | 3/2012 |

OTHER PUBLICATIONS

International Search Report corresponding to Application No. PCT/JP2016/066831; dated Aug. 16, 2016.

Written Opinion of the International Searching Authority corresponding to Application No. PCT/JP2016/066831; dated Aug. 16, 2016.

* cited by examiner

FIG. 5A (N-1)-th FRAME (PAST)

FIG. 5B N-th FRAME (PRESENT)

FIG. 5C DIRT POINT DISTRIBUTIONS

FIG. 7

OBJECTIVE SENSOR, OBJECTIVE SENSOR DIRT DETERMINATION METHOD, AND OBJECT DETECTION DEVICE

CROSS REFERENCE TO RELATED APPLICATIONS

This is the U.S. national stage of application No. PCT/JP2016/066831, filed on Jun. 7, 2016. Priority under 35 U.S.C. § 119(a) and 35 U.S.C. § 365(b) is claimed from Japanese Applications No. 2015-126708, filed Jun. 24, 2015, the disclosure of which is incorporated herein by reference.

TECHNICAL FIELD

The present invention relates to an objective sensor that outputs a signal based on a reflected wave acquired with a transmission wave transmitted, such as an electromagnetic wave or an acoustic wave, an objective sensor dirt determination method of determining the presence or absence of dirt of the objective sensor, and an object detection device using the objective sensor.

BACKGROUND ART

Conventionally, an objective sensor favorably used for, for example, detection of an object, ranging of measuring a distance to the object, or an object detection device that performs the detection and the ranging together, has been known. The objective sensor includes a device that transmits a transmission wave, such as an electromagnetic wave or an acoustic wave and receives a reflected wave including the transmission wave reflected on the object so as to output a signal based on the reflected wave. Such an objective sensor typically includes a protective member in order to protect a transmission and reception unit that transmits a transmission wave and receives a reflected wave. For example, in a case where the objective sensor is mounted on a vehicle so as to be used outside, for example, dust or mud may adhere to the protective member. When such adhesion of the dust or mud causes dirt on the protective member, it is feared that sensing performance degrades. Thus, for example, Patent Literature 1 discloses the countermeasure technique against the fear.

A vehicular object recognition device disclosed in Patent Literature 1, includes: a radar unit configured to irradiate a plurality of transmission waves over a predetermined angular range ahead of a vehicle, the radar unit configured to output a reception signal in accordance with the intensity of each reflected wave in receiving the reflected waves including the transmission waves reflected by a reflective object; and a recognition unit configured to recognize the object present ahead of the vehicle, on the basis of a transmission and reception result of the radar unit. The vehicular object recognition device further includes: a measurement unit configured to measure a time from the irradiation of each of the transmission waves to the reception of each of the reflected waves by the radar unit; an intensity detection unit configured to detect the intensity of the reflected wave from the reception signal; and a determination unit configured to determine whether dirt that causes the transmission waves to propagate internally or to be scattered, has adhered to the radar unit, on conditions that, for each of the transmission waves having a first predetermined number or more, the measurement time of the measurement unit is shorter than a predetermined measurement time and the intensity of the reflected wave detected by the intensity detection unit is predetermined intensity or more.

In Patent Literature 1 above, the presence or absence of the dirt is determined simply on the conditions that the measurement time of the transmission and reception is shorter than the predetermined measurement time and the intensity of the reflected wave is the predetermined intensity or more. Thus, for example, in a case where a large number of signals having high intensity are accidentally detected, it may be erroneously determined that the dirt is present.

CITATION LIST

Patent Literature

Patent Literature 1: JP 3915742 B1

SUMMARY OF INVENTION

The present invention has been made in consideration of the above circumstance, and an object of the present invention is to provide an objective sensor capable of determining dirt more precisely, a dirt determination method used for the objective sensor, and an object detection device using the objective sensor.

The objective sensor, the objective sensor dirt determination method, and the object detection device according to the present invention, individually transmit transmission waves in a plurality of mutually different directions and receive the respective reflected waves thereof via a protective member so as to measure, with the plurality of directions as a plurality of measurement points, a transmission and reception time and the intensity of the reflected wave for each of the plurality of measurement points. Then, the objective sensor, the objective sensor dirt determination method, and the object detection device extract, as dirt candidate points, the measurement points each having the transmission and reception time shorter than a first threshold time and the intensity equivalent to or more than threshold intensity, and regard the dirt candidate points that have been extracted, as dirt points, in a case where the dirt candidate points continue for a second threshold time or more, so as to acquire dirt point distributions on the basis of the dirt points. Then, the presence or absence of dirt on the protective member is determined, on the basis of the dirt point distributions that have been acquired. Therefore, the objective sensor, the objective sensor dirt determination method, and the object detection device according to the present invention, can determine the dirt more precisely.

The above and a different object, features, and advantages of the present invention, will be obvious with the following detailed descriptions and the attached drawings.

BRIEF DESCRIPTION OF DRAWINGS

FIGS. 5A to 5C is a diagram for describing a technique of acquiring dirt candidate points in the dirt determination processing illustrated in FIG. 4.

FIG. 7 is a diagram of different exemplary dirt point distributions acquired in the dirt determination processing illustrated in FIG. 4.

DESCRIPTION OF EMBODIMENTS

Embodiments according to the present invention will be described below on the basis of the drawings. Note that configurations denoted with the same reference signs in the figures, are indicated as the same, and thus the descriptions thereof will be appropriately omitted. In the present specification, reference signs are indicated with respective indices omitted in a case where a generic name is used, and the reference signs denoted with the respective indices are indicated in a case where individual configurations are described.

An objective sensor according to each embodiment, includes a device that outputs a signal based on a reflected wave acquired with a transmission wave transmitted and determines the presence or absence of dirt on a protective member in a transmission and reception unit. An object detection device using the objective sensor, includes a device that performs at least either detection of an object or ranging of measuring a distance to the object on the basis of the signal output from the objective sensor. Such an objective sensor and an object detection device can be applied for various uses. Here, a case where the objective sensor and the object detection device are used in an objective warning system mounted on a moving object, such as a vehicle, the objective warning system outputting a warning when detecting an object in a predetermined range from the moving object, will be described. Note that the use is not limited to this.

First Embodiment

Figure 1:
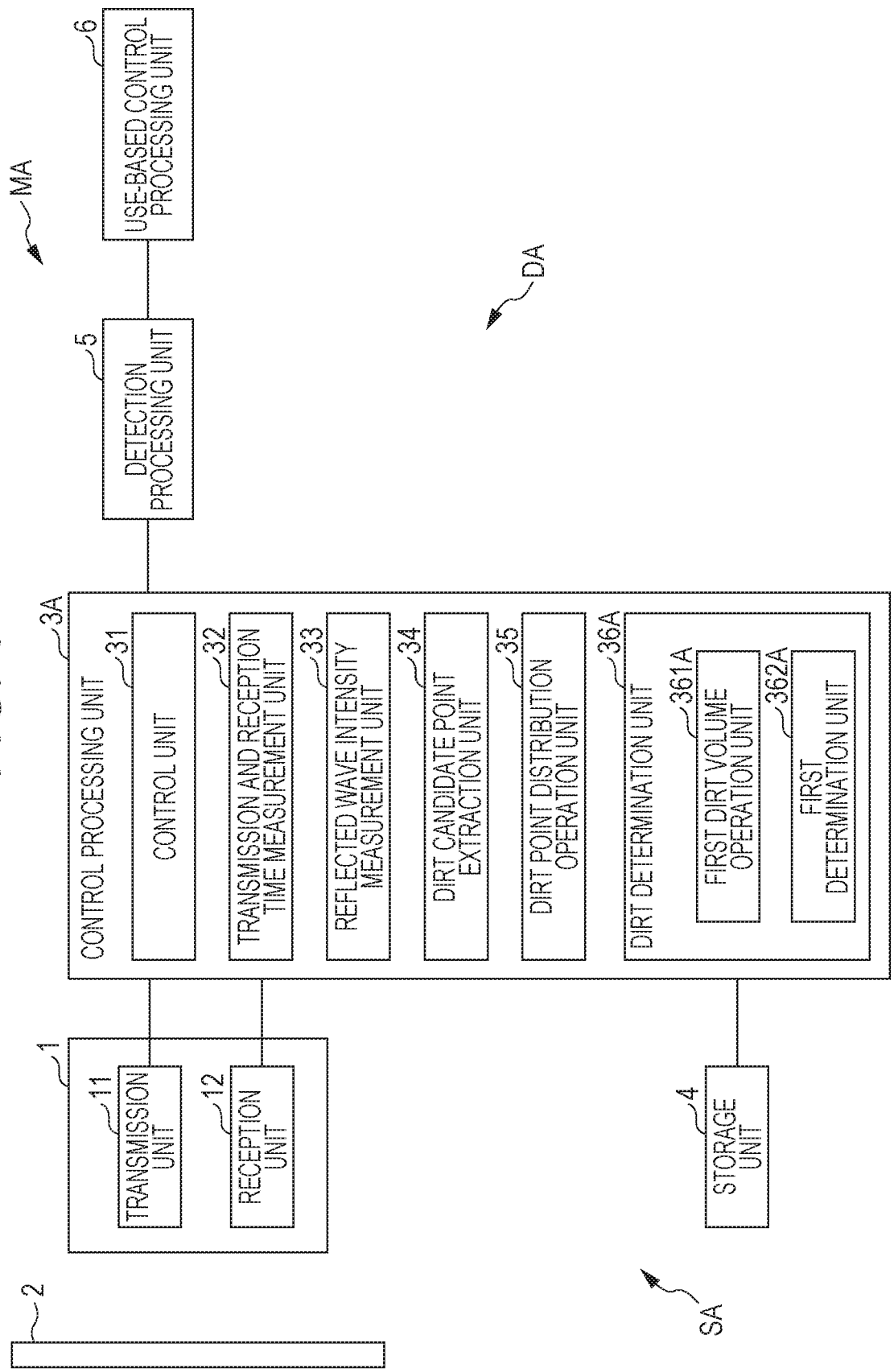
FIG. 1 is a diagram of the configuration of an objective warning system using an objective sensor and an object detection device according to a first embodiment.
Figure 2:
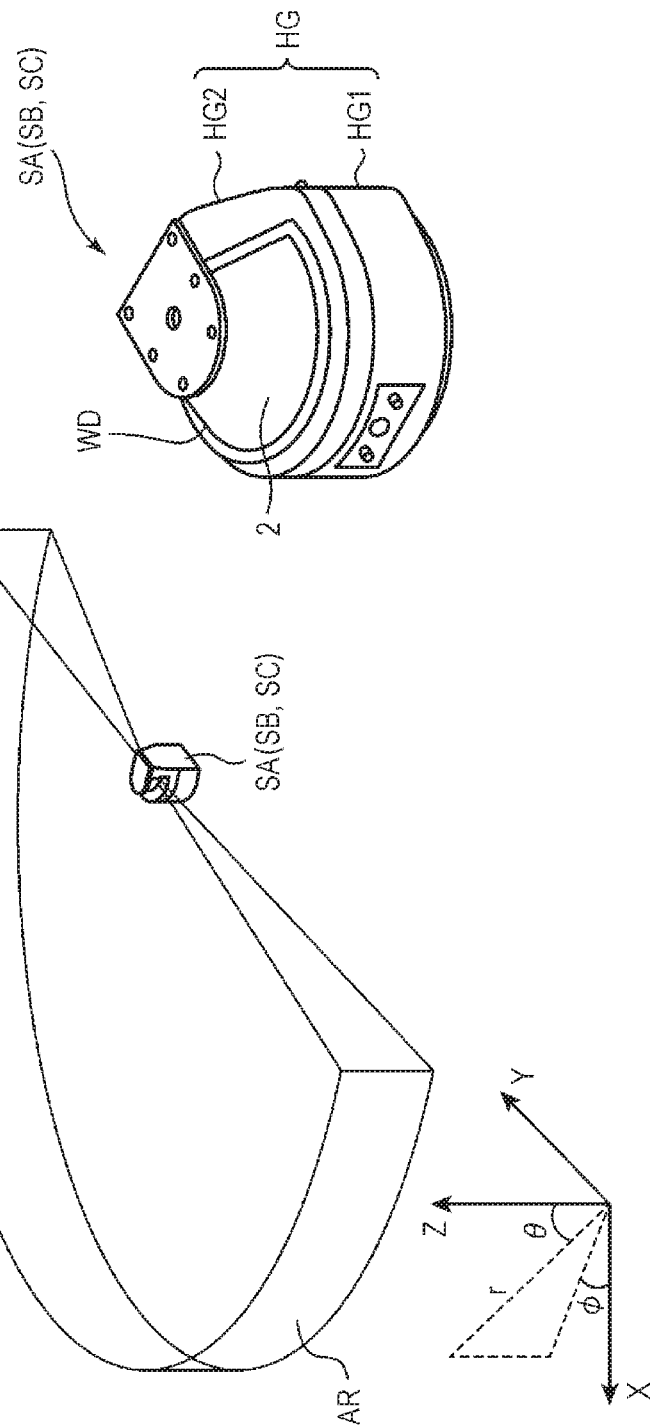
FIGS. 2A and 2B is a view of the external appearance of the objective sensor and the state of scanning according to the embodiment.

FIG. 1 is a diagram of the configuration of an objective warning system using an objective sensor and an object detection device according to a first embodiment. FIG. 2 is a view of the external appearance of the objective sensor and the state of scanning according to the embodiment. FIG. 2A illustrates the external appearance of the objective sensor, and FIG. 2B illustrates the state of the scanning.

An objective warning system MA according to the first embodiment, includes an object detection device DA and a use-based control processing unit 6 as illustrated in FIG. 1. The object detection device DA includes an objective sensor SA and a detection processing unit 5. The objective sensor SA includes a transmission and reception unit 1, a protective member 2, a control processing unit 3A, a storage unit 4, and a housing HG (refer to FIG. 2A).

The housing HG includes, as illustrated in FIG. 2A, a lower member HG1 having a bottomed semicylindrical shape and an upper member HG2 having a lidded hollow truncated semiconical shape, coupled to the upper portion of the lower member HG1. At least the transmission and reception unit 1 is housed in an internal space formed by the lower member HG1 and the upper member HG2, and the protective member 2 is fitted and fixed to an opening WD opened on the side surface of the upper member HG2, the side surface having an oblique curved surface shape. Note that the control processing unit 3A and the storage unit 4 in the objective sensor SA may be housed in the housing HG or may be provided outside the housing HG.

The transmission and reception unit 1 is connected to the control processing unit 3A, and individually transmits predetermined transmission waves in a plurality of mutually different directions so as to receive a plurality of respective reflected waves based on the plurality of transmission waves, in accordance with the control of the control processing unit 3A. More specifically, the transmission and reception unit 1 includes a transmission unit 11 that individually transmits the predetermined transmission waves in the plurality of mutually different directions and a reception unit 12 that receives the plurality of respective reflected waves based on the plurality of transmission waves. The reception unit 12 outputs a digital signal corresponding to the intensity of each of the reflected waves that have been received, to the control processing unit 3A. The transmission waves each are, for example, an electromagnetic wave, such as light or a millimeter wave, or an acoustic wave, such as an ultrasonic wave. According to the present embodiment, the transmission waves each are pulsed laser light. Thus, according to the present embodiment, the transmission unit 11 includes, for example, a laser light source that emits the laser light, such as a semiconductor laser, in a pulsed form, and a scanning optical system that sequentially irradiates the laser light emitted from the laser light source, in the plurality of mutually different directions. The scanning optical system includes, for example, an actuator, such as a motor, and a mirror (a reflecting mirror), and the actuator turns the mirror around a predetermined axis so that the incident angle of the laser light emitted from the laser light source is sequentially varied. With this arrangement, the scanning optical system sequentially irradiates the pulsed laser light emitted from the laser light source, in the plurality of mutually different directions, for example, in a predetermined irradiation range AR illustrated in FIG. 2B. As illustrated in FIG. 2B, an XYZ Cartesian coordinate system including the front direction of the objective sensor SA defined as an X direction, the height direction of the objective sensor SA orthogonal to the X direction, defined as a Z direction, and a direction orthogonal to the X direction and the Z direction, defined as a Y direction, is set. In a case where a spherical coordinate system including a radius vector r and two arguments θ and φ, is set to the XYZ Cartesian coordinate system, the argument θ is 90°±α (the α is, for example, 5°, 7°, 10°, or 15°) and the argument φ is ±90° in the irradiation range AR in the example illustrated in FIG. 2B.

Note that the argument θ is the angle of the projection of the radius vector r on the XY plane to the X axis, and the argument φ is the angle of the radius vector r to the Z axis.

The irradiation range AR illustrated in FIG. 2B is just exemplary and arbitrary, and thus the irradiation range AR is not limited to the example illustrated in FIG. 2B.

The protective member 2 is formed of a material through which the transmission waves and the reflected waves pass, and is a member for protecting the transmission and reception unit 1. According to the present embodiment, since the transmission waves each is the laser light and the reflected waves each is reflected light of the laser light, the protective member 2 is formed of a material, such as engineering plastic or glass, having translucency allowing transmission in a predetermined wavelength range having the wavelength of the laser light as the center wavelength. The protective member 2 is fitted and fixed to the opening WD formed on the side surface of the upper member HG2 of the housing HG in the example illustrated in FIG. 2A, as described above. Since the upper member HG2 has the lidded truncated semiconical shape, the side surface of the upper member HG2 has the oblique curved surface shape inclining in the height direction, the oblique curved surface shape including an arc protruding circumferentially outward. The protective member 2 has the shape corresponding to the side surface having the oblique curved surface shape, and is formed in size so that the transmission waves and the reflected waves can be transmitted and received, respectively, in the irradiation range AR.

The storage unit 4 is connected to the control processing unit 3A, and includes a circuit that stores various predetermined programs and various types of predetermined data, in accordance with the control of the control processing unit 3A. The various predetermined programs include control processing programs including: a transmission and reception program for individually transmitting the transmission waves in the plurality of mutually different directions and receiving the plurality of respective reflected waves based on the plurality of transmission waves; a transmission and reception time measurement program for measuring, with the plurality of directions defined as a plurality of measurement points, for each of the plurality of measurement points, the transmission and reception time from the transmission time of the transmission wave relating to each of the measurement points to the reception time of the reflected wave based on the transmission wave; a reflected wave intensity measurement program for measuring, for each of the plurality of measurement points, the intensity of the reflected wave based on the transmission wave relating to each of the measurement points; a dirt candidate point extraction program for extracting, as dirt candidate points, from the plurality of measurement points, the measurement points each having the transmission and reception time measured with the transmission and reception time measurement program, shorter than a predetermined first threshold time Tht1 that has been previously set, and the intensity measured with the reflected wave intensity measurement program, equivalent to or more than predetermined threshold intensity Thi that has been previously set; a dirt point distribution operation program for extracting, as dirt points, the dirt candidate points each extracted continuously for a predetermined second threshold time Tht2 that has been previously set, or more, at the same measurement point at mutually different times, from the dirt candidate points extracted with the dirt candidate point extraction program, so as to acquire dirt point distributions for the plurality of measurement points; and a dirt determination program for determining the presence or absence of dirt on the protective member 2 on the basis of the dirt point distributions acquired with the dirt point distribution operation program. According to the present embodiment, the dirt determination program includes: a first dirt volume operation program for acquiring, as a first dirt volume, the total number of the dirt points from the dirt point distributions acquired with the dirt point distribution operation program; and a first determination program for determining the presence of the dirt in a case where the first dirt volume acquired with the first dirt volume operation program, is a predetermined first determination threshold value Thd1 that has been previously set or more. The various types of predetermined data includes various types of data, such as data necessary for executing the various programs and data acquired by the execution of the various programs. The storage unit 4 has, for example, a read only memory (ROM) being a nonvolatile memory or an electrically erasable programmable read only memory (EEPROM) being a rewritable nonvolatile memory. The storage unit 4 includes, for example, a random access memory (RAM) being a so-called working memory for the control processing unit 3A, the random access memory storing data generated during the execution of the predetermined programs.

As described above, the control processing unit 3A is connected to the transmission and reception unit 1 and the storage unit 4, and is further connected to the detection processing unit 5. The control processing unit 3A includes a circuit that controls each unit of the objective sensor SA in accordance with the function of each unit, transmits and receives the transmission waves and the reflected waves, respectively, determines the presence or absence of the dirt on the protective member 2, and outputs at least either the transmission and reception time or the intensity of each of the reflected waves in accordance with the determination result, to the detection processing unit 5. The control processing unit 3A includes, for example, a central processing unit (CPU) and a peripheral circuit thereof. The control processing unit 3A functionally includes a control unit 31, a transmission and reception time measurement unit 32, a reflected wave intensity measurement unit 33, a dirt candidate point extraction unit 34, a dirt point distribution operation unit 35, and a dirt determination unit 36A, with the execution of the control processing programs.

The control unit 31 controls each unit of the objective sensor SA in accordance with the function of each unit.

With the plurality of directions as the plurality of measurement points, the transmission and reception time measurement unit 32 measures, for each of the plurality of measurement points, the transmission and reception time from the transmission time of the transmission wave relating to each of the measurement points to the reception time of the reflected wave based on the transmission wave.

The reflected wave intensity measurement unit 33 measures, for the plurality of measurement points, the intensity of the reflected wave based on the transmission wave relating to each of the measurement points.

The dirt candidate point extraction unit 34 extracts, as the dirt candidate points, from the plurality of measurement points, the measurement points each having the transmission and reception time measured by the transmission and reception time measurement unit 32, shorter than the predetermined first threshold time Tht1 that has been previously set, and the intensity measured by the reflected wave intensity measurement unit 33, equivalent to or more than the predetermined threshold intensity Thi that has been previously set.

The dirt point distribution operation unit 35 extracts, as the dirt points, the dirt candidate points each extracted continuously for the predetermined second threshold time Tht2 that has been previously set, or more, at the same measurement point at the mutually different times, from the dirt candidate points extracted by the dirt candidate point extraction unit 34, so as to acquire the dirt point distributions for the plurality of measurement points.

The dirt determination unit 36A determines the presence or absence of the dirt on the protective member 2, on the basis of the dirt point distributions acquired by the dirt point distribution operation unit 35. According to the present embodiment, the dirt determination unit 36A functionally includes: a first dirt volume operation unit 361A that acquires, as the first dirt volume DV1, the total number of the dirt points from the dirt point distributions acquired by the dirt point distribution operation unit 35; and a first determination unit 362A that determines the presence of the dirt in a case where the first dirt volume DV1 acquired by the first dirt volume operation unit 361A is the first determination threshold value Thd1 or more.

The detection processing unit 5 is connected to the use-based control processing unit 6, and performs at least either detection of an object or ranging of measuring a distance to the object, on the basis of at least either the transmission and reception time measured by the transmission and reception time measurement unit 32 or the intensity measured by the reflected wave intensity measurement unit 33 for each of the plurality of measurement points. For example, for each of the plurality of measurement points, the detection processing unit 5 compares the intensity of each of the measurement points measured by the reflected wave intensity measurement unit 33, to a predetermined object detection threshold value Thob that has been previously set. Then, in a case where the intensity of each of the measurement points is the predetermined object detection threshold value Thob or more, the detection processing unit 5 determines that the object is present at each of the measurement points, and outputs the determination result to the use-based control processing unit 6. For example, for each of the plurality of measurement points, the detection processing unit 5 multiplies half of the transmission and reception time of each of the measurement points measured by the transmission and reception time measurement unit 32, by the propagation speed of the transmission wave, so as to acquire the distance to the object that has reflected the transmission wave (a time of fright (TOF) method). Then, the detection processing unit 5 outputs the distance (a ranging result) that has been acquired, to the use-based control processing unit 6. For example, the intensity of the reflected wave is inversely proportional to the distance to the object that has caused the reflected wave. In a case where the reflectivity of the object can be estimated, the detection processing unit 5 uses, for each of the plurality of measurement points, a correction value that has been previously set, based on the intensity of each of the measurement points measured by the reflected wave intensity measurement unit 33, so as to correct the distance to the object that has reflected the transmission wave, acquired as described above on the basis of the transmission and reception time of each of the measurement points measured by the transmission and reception time measurement unit 32. Then, the detection processing unit 5 outputs the distance that has been corrected, to the use-based control processing unit 6. According to the present embodiment, the detection processing unit 5 determines, for each of the plurality of measurement points, the presence or absence of the object as described above on the basis of the intensity of each of the measurement points measured by the reflected wave intensity measurement unit 33. In a case where determining that the object is present, the detection processing unit 5 acquires the distance to the object that has reflected the transmission wave as described above on the basis of the transmission and reception time of each of the measurement points measured by the transmission and reception time measurement unit 32, so as to output the distance that has been acquired, together with measurement point information (transmission direction information) expressing each of the measurement points (namely, each of the directions in which the transmission waves have been transmitted), to the use-based control processing unit 6.

The use-based control processing unit 6 performs predetermined processing corresponding to the use of the system using the objective sensor SA and the object detection device DA, on the basis of the detection result output from the detection processing unit 5 (according to the present embodiment, the measurement point information and the distance). According to the present embodiment, as described above, since the system using the objective sensor SA and the object detection device DA, includes the objective warning system MA, the use-based control processing unit 6 warns that the object has been detected at the distance output from the detection processing unit 5 in the direction expressed by the measurement point information output from the detection processing unit 5. More specifically, for example, the use-based control processing unit 6 displays, onto a display device not illustrated, a direction in which the direction expressed by the measurement point information output from the detection processing unit 5, has been projected on the XY plane. The use-based control processing unit 6 outputs a message of the effect that the object has been detected at the distance output from the detection processing unit 5, through a speaker not illustrated. For example, the use-based control processing unit 6 outputs, through the speaker not illustrated, an alarm varying intermittently sounding in length in accordance with the distance output from the detection processing unit 5, in a case where the direction expressed by the measurement point information output from the detection processing unit 5, faces forward.

Figure 3:
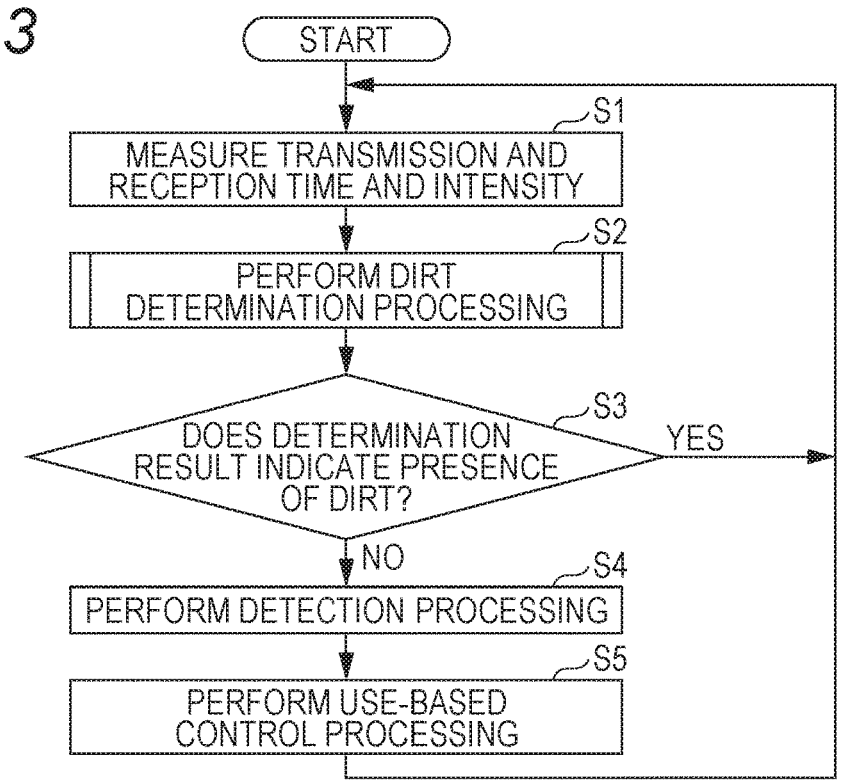
FIG. 3 is a flowchart of the operation of the objective warning system according to the first embodiment.
Figure 4:
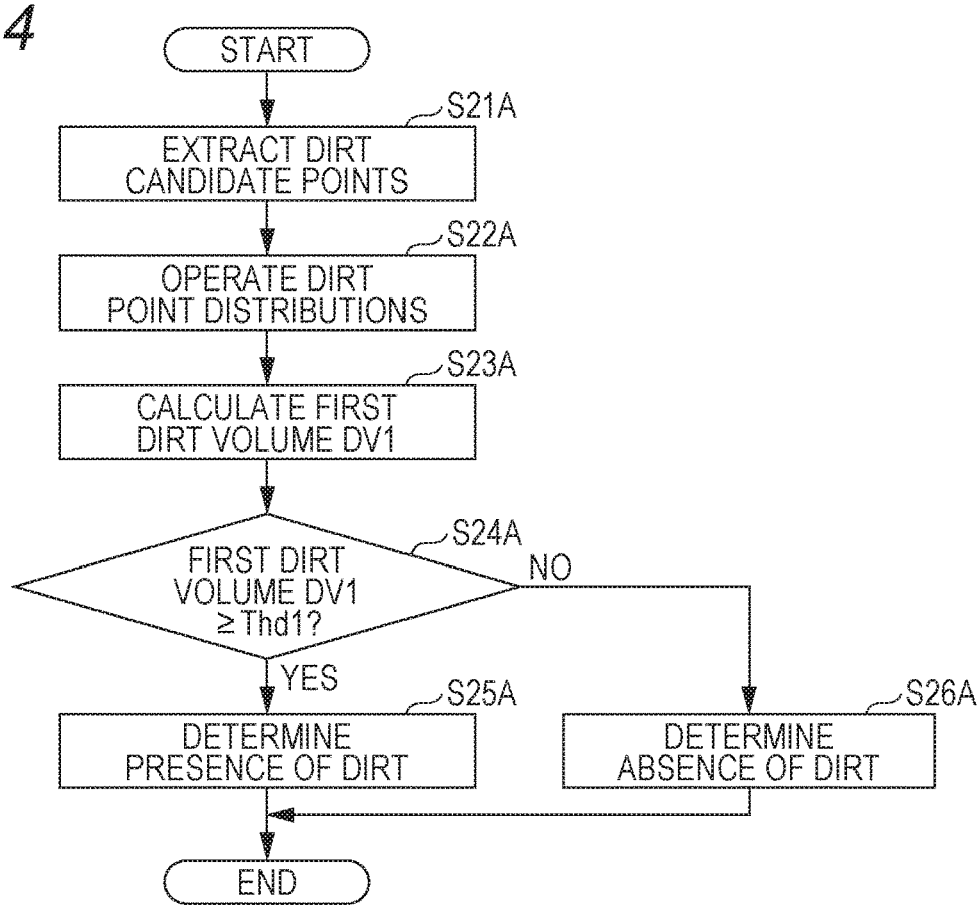
FIG. 4 is a flowchart of dirt determination processing of the objective sensor in the objective warning system according to the first embodiment.
Figure 6:
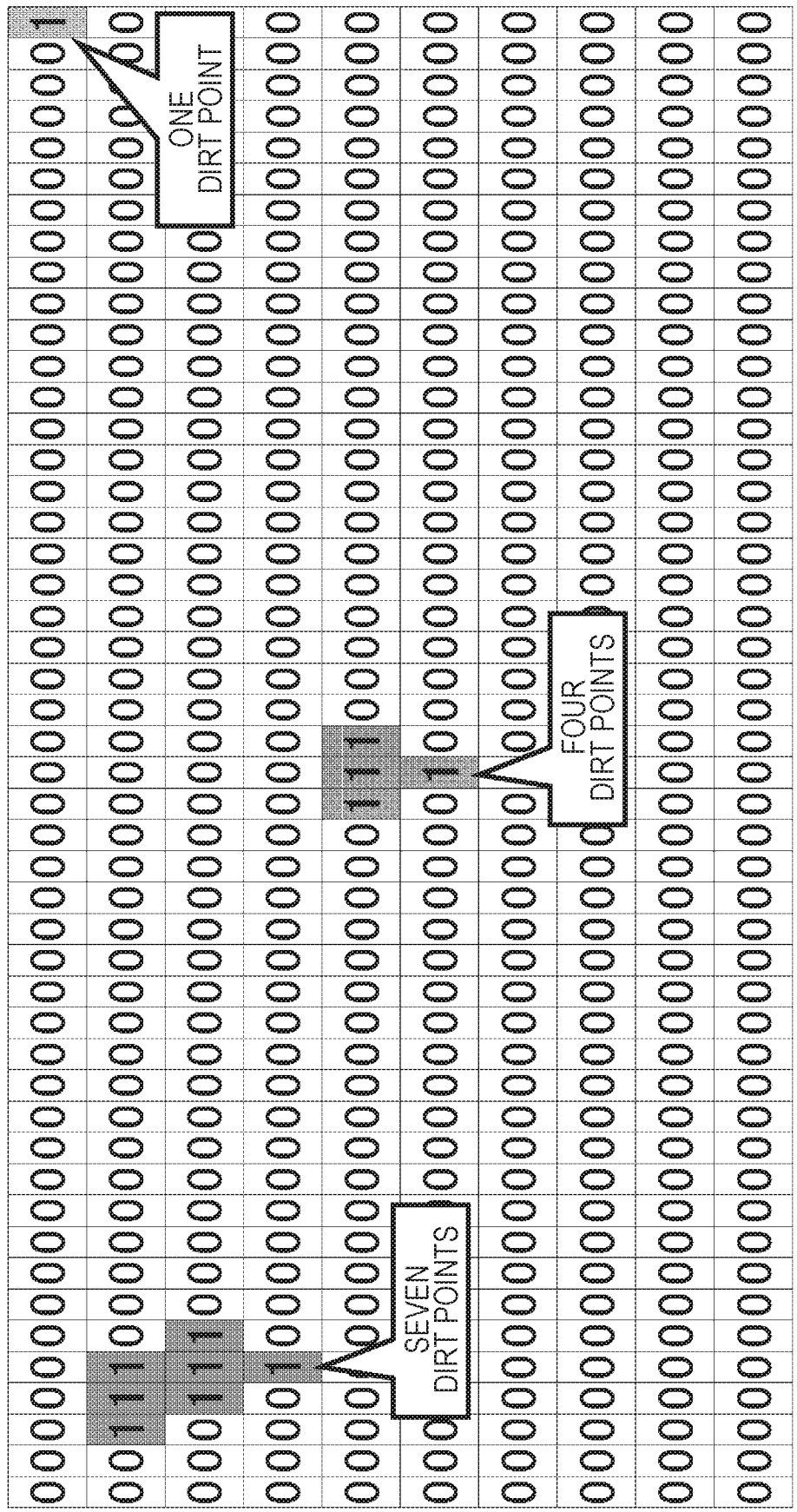
FIG. 6 is a diagram of exemplary dirt point distributions acquired in the dirt determination processing illustrated in FIG. 4.
Figure 7:
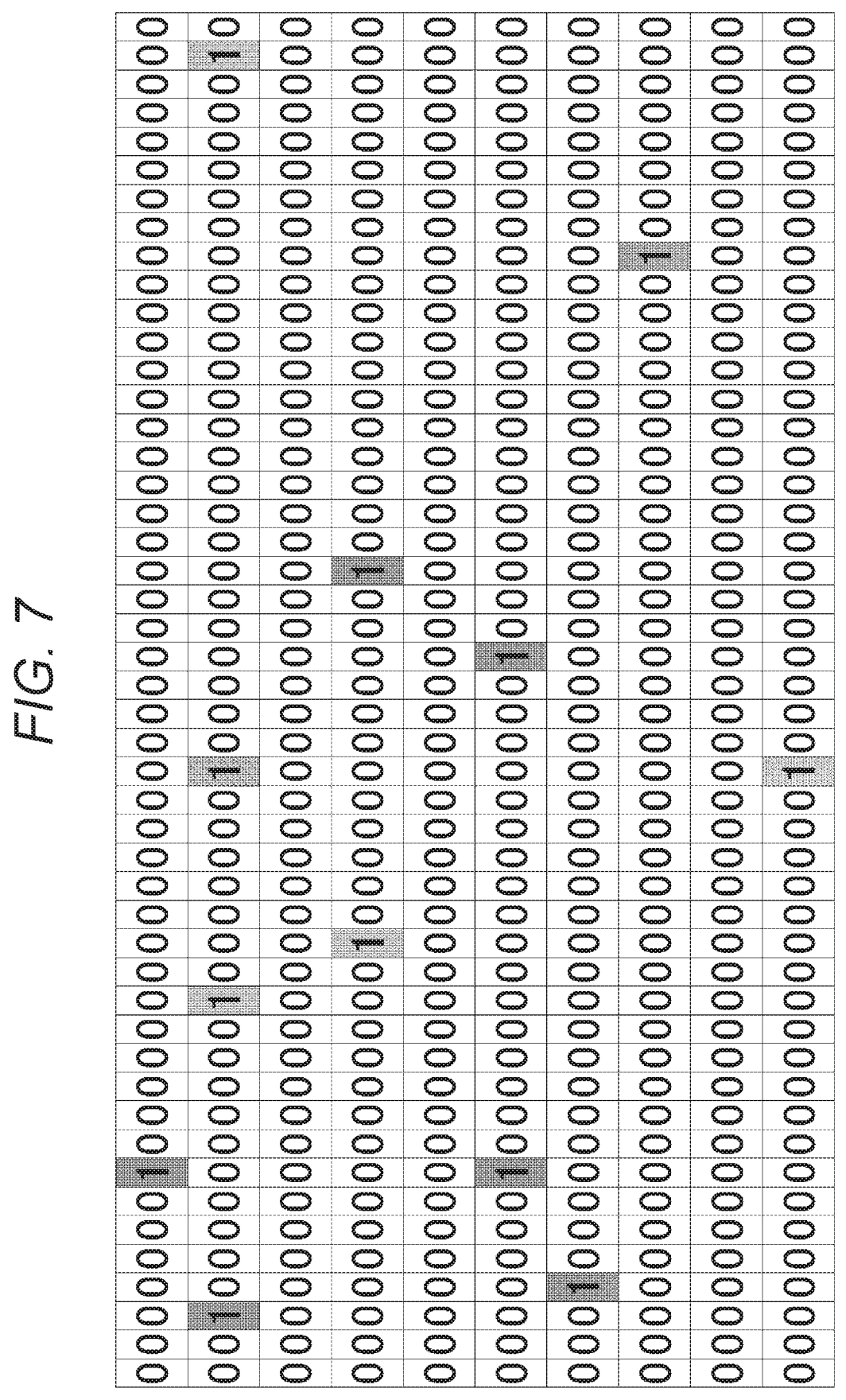

Next, the operation according to the present embodiment will be described. FIG. 3 is a flowchart of the operation of the objective warning system according to the first embodiment. FIG. 4 is a flowchart of dirt determination processing of the objective sensor in the objective warning system according to the first embodiment. FIGS. 5A-5C are diagrams for describing a technique of acquiring dirt candidate points in the dirt determination processing illustrated in FIG. 4. FIG. 6 is a diagram of exemplary dirt point distributions acquired in the dirt determination processing illustrated in FIG. 4. FIG. 7 is a diagram of different exemplary dirt point distributions acquired in the dirt determination processing illustrated in FIG. 4.

First, the operation of the objective warning system MA according to the present embodiment, will be described. When booting, the objective warning system MA performs necessary initialization to each unit so as to start the operations thereof. With the execution of the control processing programs, the control processing unit 3A functionally includes the control unit 31, the transmission and reception time measurement unit 32, the reflected wave intensity measurement unit 33, the dirt candidate point extraction unit 34, the dirt point distribution operation unit 35, and the dirt determination unit 36A. The dirt determination unit 36A functionally includes the first dirt volume operation unit 361A and the first determination unit 362A.

In FIG. 3, the control processing unit 3A first measures the transmission and reception time and the intensity for each of the plurality of directions (the plurality of measurement points) (S1). More specifically, the control unit 31 of the control processing unit 3A causes the transmission unit 11 to transmit a transmission wave in a direction to be first measured in the plurality of directions (the plurality of measurement points), and notifies the transmission and reception time measurement unit 32 of the transmission timing (the transmission time) of the transmission wave. When receiving a reflected wave with respect to the transmission wave, the reception unit 12 outputs a digital signal corresponding to the intensity of the reflected wave, to the control processing unit 3A. The transmission and reception time measurement unit 32 of the control processing unit 3A acquires the transmission and reception time from the transmission timing (the transmission time) of the transmission wave relating to the first measurement point, to the reception timing at which the digital signal is received from the reception unit 12 (namely, the reception time of the reflected wave based on the transmission wave relating to the first measurement point). The reflected wave intensity measurement unit 33 of the control processing unit 3A acquires the intensity of the reflected wave based on the transmission wave relating to the first measurement point, on the basis of the digital signal received from the reception unit 12. The control processing unit 3A associates, as a measurement result of the first measurement point, the transmission and reception time acquired by the transmission and reception time measurement unit 32 with the intensity acquired by the reflected wave intensity measurement unit 33 each other, so as to store the transmission and reception time and the intensity into the storage unit 4. Note that, in a case where the digital signal is not received from the reception unit 12 even when a predetermined elapsed time that has been previously set, passes from the transmission timing (the transmission time) of the transmission wave relating to the first measurement point, the transmission and reception time measurement unit 32 may regard the transmission and reception time as infinity and the reflected wave intensity measurement unit 33 may regard the intensity as zero. Next, in order to measure the second measurement point, the control unit 31 of the control processing unit 3A causes the transmission unit 11 to transmit a transmission wave in a direction to be second measured in the plurality of directions (the plurality of measurement points), and notifies the transmission and reception time measurement unit 32 of the transmission timing (the transmission time) of the transmission wave. When receiving a reflected wave with respect to the transmission wave, the reception unit 12 outputs a digital signal corresponding to the intensity of the reflected wave, to the control processing unit 3A. The transmission and reception time measurement unit 32 of the control processing unit 3A acquires the transmission and reception time from the transmission timing (the transmission time) of the transmission wave relating to the second measurement point, to the reception timing at which the digital signal is received from the reception unit 12 (namely, the reception time of the reflected wave based on the transmission wave relating to the second measurement point). The reflected wave intensity measurement unit 33 of the control processing unit 3A acquires the intensity of the reflected wave based on the transmission wave relating to the second measurement point, on the basis of the digital signal received from the reception unit 12. Then, the control processing unit 3A associates, as a measurement result of the second measurement point, the transmission and reception time acquired by the transmission and reception time measurement unit 32 with the intensity acquired by the reflected wave intensity measurement unit 33 each other, so as to store the transmission and reception time and the intensity into the storage unit 4. After that, the control processing unit 3A performs measurement similarly until the last in sequence in the plurality of directions (the plurality of measurement points) so as to measure the transmission and reception time and the intensity for each of all the directions (all the measurement points). With this arrangement, for example, the irradiation range AR is two-dimensionally scanned from the first direction (the first measurement point) on the following conditions: $\varphi=-90°$ and $\theta=90°-\alpha$, to the last direction (the last measurement point) on the following conditions: $\varphi=90°$ and $\theta=90°+\alpha$.

Next, the control processing unit 3A performs the dirt determination processing of determining the presence or absence of the dirt on the protective member 2 (S2). The dirt determination processing will be described later.

Next, the control processing unit 3A determines whether a determination result of the dirt determination processing in the processing S2 indicates the presence of the dirt (S3). On the basis of the determination result, in a case where the dirt is present (Yes), the control processing unit 3A returns the processing to the processing S1 without outputting, to the detection processing unit 5, the transmission and reception time measured by the transmission and reception time measurement unit 32 and the intensity measured by the reflected wave intensity measurement unit 33 for each of the plurality of measurement points. Meanwhile, on the basis of the determination result, in a case where no dirt is present (No), the control processing unit 3A outputs the transmission and reception time measured by the transmission and reception time measurement unit 32 and the intensity measured by the reflected wave intensity measurement unit 33 for each of the plurality of measurement points, to the detection processing unit 5.

When receiving the transmission and reception time and the intensity, the detection processing unit 5 performs detection processing of performing at least either the detection of the object or the ranging of measuring the distance to the object, on the basis of at least either the transmission and reception time measured by the transmission and reception time measurement unit 32 or the intensity measured by the reflected wave intensity measurement unit 33 for each of the plurality of measurement points (S4). For example, according to the present embodiment, the detection processing unit 5 compares, for each of the plurality of measurement points, the intensity of each of the measurement points measured by the reflected wave intensity measurement unit 33, to the object detection threshold value Thob, and determines that the object is present at each of the measurement points in a case where the intensity of each of the measurement points is the object detection threshold value Thob or more. In a case where the presence of the object is determined, the detection processing unit 5 multiplies half of the transmission and reception time of each of the measurement points measured by the transmission and reception time measurement unit 32, by the propagation speed of the transmission wave, so as to acquire the distance to the object that has reflected the transmission wave. Then, the detection processing unit 5 outputs the distance that has been acquired, together with the measurement point information expressing each of the measurement points (namely, each of the directions in which the transmission waves have been transmitted), to the use-based control processing unit 6.

When receiving the output (according to the present embodiment, the measurement point information and the distance) from the detection processing unit 5, the use-based control processing unit 6 performs, as use-based control processing, the predetermined processing corresponding to the use of the system using the objective sensor SA and the object detection device DA, on the basis of the output from the detection processing unit 5, so as to return the processing to the processing S1 (S5). For example, according to the present embodiment, the use-based control processing unit 6 warns that the object has been detected at the distance output from the detection processing unit 5 in the direction expressed by the measurement point information output from the detection processing unit 5.

In this manner, for the objective warning system MA according to the present embodiment, it is feared that sensing performance degrades in the objective sensor SA or the reliability of a sensing result degrades in a case where the presence of the dirt is determined in the processing S3. Thus, the control processing unit 3A does not output the transmission and reception time measured by the transmission and reception time measurement unit 32 and the intensity measured by the reflected wave intensity measurement unit 33 for each of the plurality of measurement points, to the detection processing unit 5, so that the detection processing unit 5 does not perform the detection processing in the processing S4. Therefore, according to the present embodiment, the objective warning system MA having higher reliability can be provided.

Next, the dirt determination processing in the processing S2, will be described below. In the dirt determination processing S2 in FIG. 4, the dirt candidate point extraction unit 34 first extracts, as the dirt candidate points, from the plurality of measurement points, the measurement points each having the transmission and reception time measured by the transmission and reception time measurement unit 32, shorter than the first threshold time Tht1, and the intensity measured by the reflected wave intensity measurement unit 33, equivalent to or more than the threshold intensity Thi (S21A). Since the dirt determination processing determines the presence or absence of the dirt adhering to the protective member 2, the first threshold time Tht1 is appropriately set in accordance with, for example, the distance (length) between the transmission and reception unit 1 and the external surface of the protective member 2, and the propagation speed of the transmission wave. For example, the first threshold time Tht1 is set to, for example, the time from the reflection of the transmission wave on the dirt adhering to the protective member 2 after the transmission of the transmission wave from the transmission unit 11, to the reception of the reflected wave of the transmission wave by the reception unit 12, or a time including the time added with a predetermined margin. Since the dirt determination processing determines the presence or absence of the dirt adhering to the protective member 2 relatively close to the transmission and reception unit 1, the threshold intensity Thi is set to a relatively large value on the basis of an experimental result of a plurality of samples.

When the measurement point of a dirt candidate point is denoted with "1" and the measurement point of a non-dirt candidate point being a dirt candidate points is denoted with "0", a result of the processing S21A can be expressed, for example, with dirt candidate point distributions for the plurality of measurement points, as illustrated in FIG. 5A or 5B.

Next, the dirt point distribution operation unit 35 extracts, as the dirt points, the dirt candidate points each extracted continuously for the second threshold time Tht2 or more, at the same measurement point at mutually different times, from the dirt candidate points extracted by the dirt candidate point extraction unit 34, so as to acquire the dirt point distributions for the plurality of measurement points (S22A).

The second threshold time Tht2 is appropriately set on the basis of an experimental result of a plurality of samples. For example, in a case where the transmission and reception time and the intensity acquired in the processing S1 once, described above with FIG. 3, are defined as one frame, the second threshold time Tht2 is set to a temporally continuous appropriate frame count, such as temporally continuous two frames, three frames, five frames, or ten frames. As one example, in a case where the second threshold time Tht2 has two frames, FIG. 5B illustrates the dirt candidate point distributions acquired in the processing S21A on the basis of the current N-th frame, and FIG. 5A illustrates the dirt candidate point distributions acquired in the processing S21A on the basis of the (N-1)-th frame temporally one previous to the present, the dirt point distribution operation unit 35 performs the AND operation of the dirt candidate point distributions of the (N-1)-th frame illustrated in FIG. 5A and the dirt candidate point distributions of the N-th frame illustrated in FIG. 5B for each of the plurality of measurement points, so as to acquire the dirt point distributions illustrated in FIG. 5C. The AND operation satisfies the following expressions: 1 AND 1=1, 1 AND 0=0, and 0 AND 1=0. Note that the dirt point distributions exemplarily illustrated in FIG. 6 is the same as the dirt point distributions illustrated in FIG. 5C. Since the AND operation is performed in this manner, the measurement point of a dirt point is denoted with "1" and the measurement point of a non-dirt point not being a dirt point is denoted with "0" in the dirt point distributions.

Next, the first dirt volume operation unit 361A of the dirt determination unit 36A acquires, as the first dirt volume DV1, the total number of the dirt points from the dirt point distributions acquired by the dirt point distribution operation unit 35 in the processing S22A (S23A). For example, in the dirt point distributions illustrated in FIG. 5C or FIG. 6, the first dirt volume DV1 satisfies the following expression: DV1=7+4+1=12. For example, in the dirt point distributions illustrated in FIG. 7, the first dirt volume DV1 satisfies the following expression: DV1=1+1+1+1+1+1+1+1+1+1+1+1=12.

Next, the first determination unit 362A of the dirt determination unit 36A determines whether the first dirt volume DV1 acquired by the first dirt volume operation unit 361A is the first determination threshold value Thd1 or more (S24A). The first determination threshold value Thd1 is appropriately set on the basis of an experimental result of a plurality of samples.

On the basis of the determination result, in a case where the first dirt volume DV1 acquired by the first dirt volume operation unit 361A is the first determination threshold value Thd1 or more (Yes), the first determination unit 362A determines the presence of the dirt (S25A), and then completes the dirt determination processing S2.

On the basis of the determination result, in a case where the first dirt volume DV1 acquired by the first dirt volume operation unit 361A is less than the first determination threshold value Thd1 (No), the first determination unit 362A determines the absence of the dirt (S26A), and then completes the dirt determination processing S2.

As described above, the objective warning system MA, the object detection device DA, the objective sensor SA, and the objective sensor SA dirt determination method implemented therein, according to the present embodiment, first extract, as the dirt candidate points, the measurement points each having the transmission and reception time shorter than the first threshold time Tht1 and the intensity equivalent to or more than the threshold intensity Thi, regards, as the dirt points, the dirt candidate points that have been extracted, in a case where the dirt candidate points continue for the second threshold time Tht2 or more, acquire the dirt point distributions on the basis of the dirt points, and determines the presence or absence of the dirt on the protective member 2 on the basis of the dirt point distributions that have been acquired, instead of determining the presence or absence of the dirt simply on the conditions that the transmission and reception time is shorter than the first threshold time Tht1 and the intensity is the threshold intensity Thi or more. Thus, the objective warning system MA, the object detection device DA, the objective sensor SA, and the dirt determination method can determine the dirt more precisely. Thus, the object detection device DA can perform at least either the detection of the object or the ranging of measuring the distance to the object, more precisely, and the objective warning system MA can issue a warning with higher reliability.

The objective warning system MA, the object detection device DA, the objective sensor SA, and the dirt determination method can quantify, as the first dirt volume DV1, the dirt volume expressing the degree of the dirt, with the simple technique of acquiring the total number of the dirt points.

Next, a different embodiment will be described.

Second Embodiment

In the objective warning system MA using the objective sensor SA and the object detection device DA according to the first embodiment, as described above, the first dirt volume DV1 of the dirt point distributions, for example, illustrated in FIG. 6 and the first dirt volume DV1 of the dirt point distributions, for example, illustrated in FIG. 7 are the same in value. Thus, even with the first dirt volume DV1, the objective warning system MA has difficulty in distinguishing between local dirt in a case where the dirt over a relatively large area relatively locally adheres to the protective member 2, as illustrated in FIG. 6, and discrete dirt in a case where the dirt over a relatively small area discretely adheres to the protective member 2 over a relatively wide range, for example, as illustrated in FIG. 7. An objective warning system MB using an objective sensor SB and an object detection device DB according to a second embodiment, distinguishes between such local dirt and discrete dirt.

Figure 8:
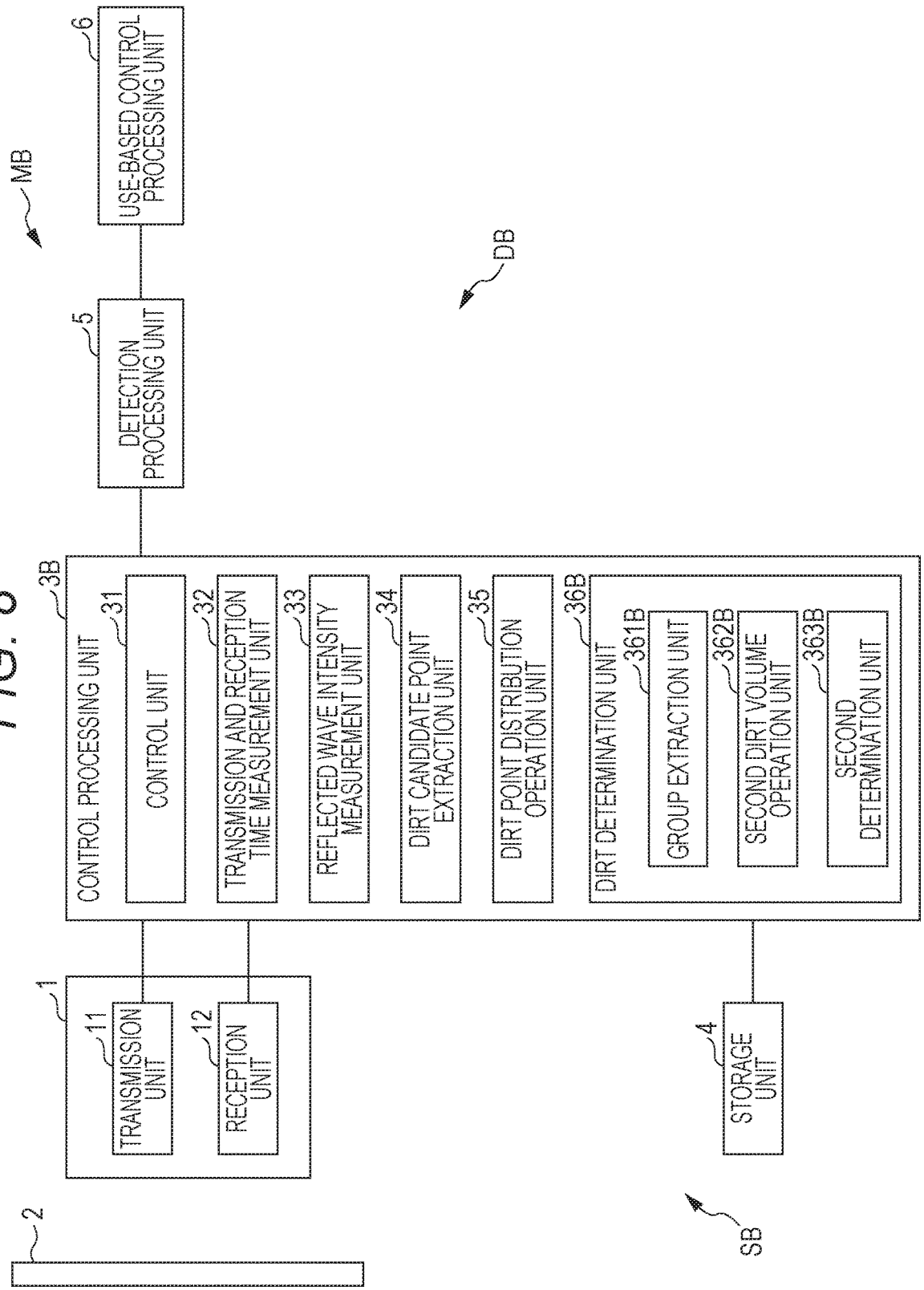
FIG. 8 is a diagram of the configuration of an objective warning system using an objective sensor and an object detection device according to a second embodiment.

FIG. 8 is a diagram of the configuration of the objective warning system using the objective sensor and the object detection device according to the second embodiment. The objective warning system MB according to the second embodiment, includes, for example, the object detection device DB and a use-based control processing unit 6, as illustrated in FIG. 8. The object detection device DB includes the objective sensor SB and a detection processing unit 5. The objective sensor SB includes a transmission and reception unit 1, a protective member 2, a control processing unit 3B, a storage unit 4, and a housing HG.

The use-based control processing unit 6 in the objective warning system MB according to the second embodiment, is similar to the use-based control processing unit 6 in the objective warning system MA according to the first embodiment, and thus the description thereof will be omitted. The detection processing unit 5 in the objective warning system MB according to the second embodiment, is similar to the detection processing unit 5 in the objective warning system MA according to the first embodiment, and thus the description thereof will be omitted. The transmission and reception unit 1, the protective member 2, the storage unit 4, and the housing HG in the objective sensor SB in the objective warning system MB according to the second embodiment, are similar to the transmission and reception unit 1, the protective member 2, the storage unit 4, and the housing HG in the objective sensor SA in the objective warning system MA according to the first embodiment, respectively, and thus the descriptions thereof will be omitted.

Similarly to the control processing unit 3A, the control processing unit 3B is connected to the transmission and reception unit 1, the storage unit 4, and the detection processing unit 5. The control processing unit 3B includes a circuit that controls each unit of the objective sensor SB in accordance with the function of each unit, transmits and receives transmission waves and reflected waves, respectively, determines the presence or absence of dirt on the protective member 2, and outputs at least either transmission and reception time or the intensity of each of the reflected waves in accordance with the determination result, to the detection processing unit 5. The control processing unit 3B functionally includes a control unit 31, a transmission and reception time measurement unit 32, a reflected wave intensity measurement unit 33, a dirt candidate point extraction unit 34, a dirt point distribution operation unit 35, and a dirt determination unit 36B, with execution of the control processing programs thereof.

The control unit 31, the transmission and reception time measurement unit 32, the reflected wave intensity measurement unit 33, the dirt candidate point extraction unit 34, and the dirt point distribution operation unit 35 in the control processing unit 3B according to the second embodiment, are similar to the control unit 31, the transmission and reception time measurement unit 32, the reflected wave intensity measurement unit 33, the dirt candidate point extraction unit 34, and the dirt point distribution operation unit 35 in the control processing unit 3A according to the first embodiment, respectively, and thus the descriptions thereof will be omitted.

The dirt determination unit 36B determines the presence or absence of the dirt on the protective member 2 on the basis of dirt point distributions acquired by the dirt point distribution operation unit 35. According to the second embodiment, the dirt determination unit 36B functionally includes: a group extraction unit 361B that groups, as a dirt point group, dirt points adjacent to each other, from the dirt point distributions acquired by the dirt point distribution operation unit 35; a second dirt volume operation unit 362B that acquires, as a second dirt volume DV2, the total number of a dirt point having an area of a predetermined threshold area Tha or more and the dirt points grouped in the dirt point group having the area of the predetermined threshold area Tha or more (the dirt points belonging to the dirt point group) from the dirt point distributions acquired by the dirt point distribution operation unit 35; and a second determination unit 363B that determines the presence of the dirt in a case where the second dirt volume DV2 acquired by the second dirt volume operation unit 362B is a second determination threshold value Thd2 or more. The predetermined threshold area Tha is previously set in accordance with an area to be excluded from the calculation of the second dirt volume DV2 (in other words, an area to be considered in the calculation of the second dirt volume DV2), and, for example, is appropriately set on the basis of an experimental result of a plurality of samples (Tha>0). Note that, if the threshold area Tha is zero, the second dirt volume DV2 agrees with the first dirt volume DV1.

Figure 9:
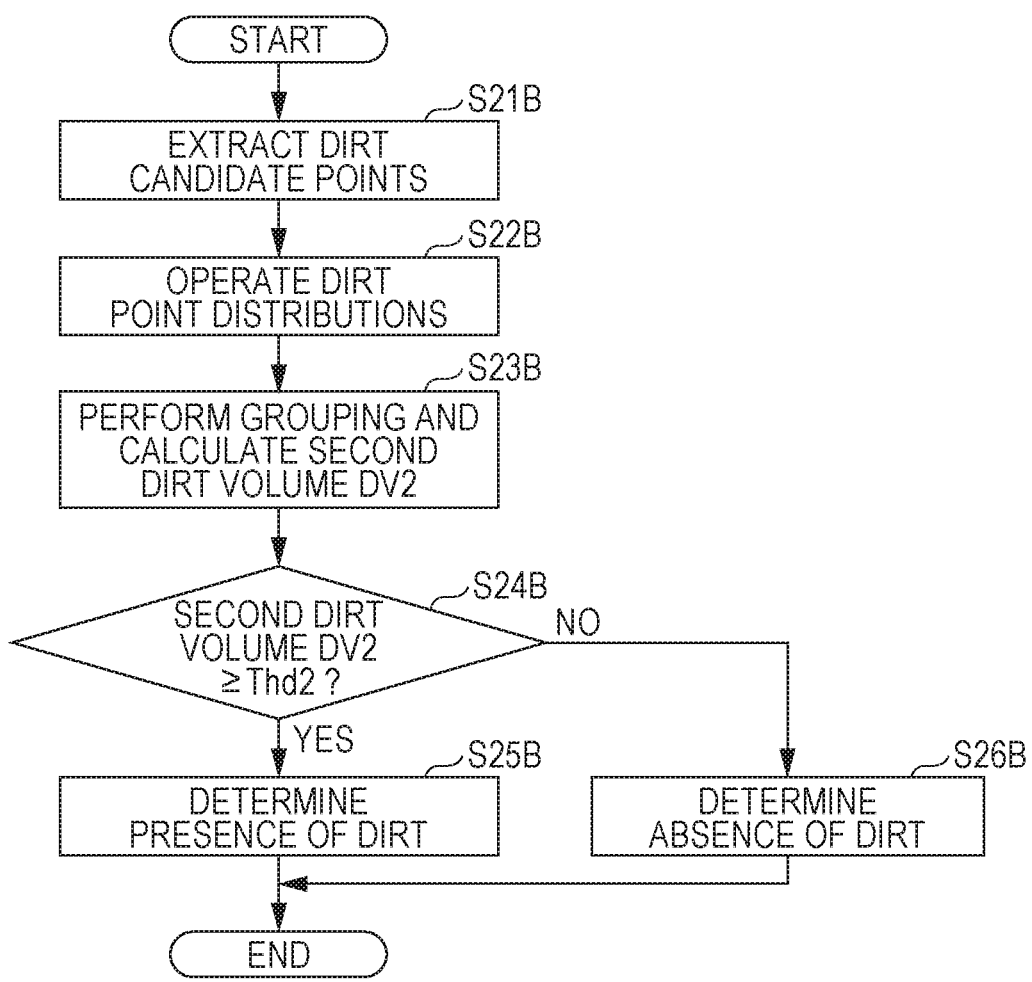
FIG. 9 is a flowchart of dirt determination processing of the objective sensor in the objective warning system according to the second embodiment.
Figure 10:
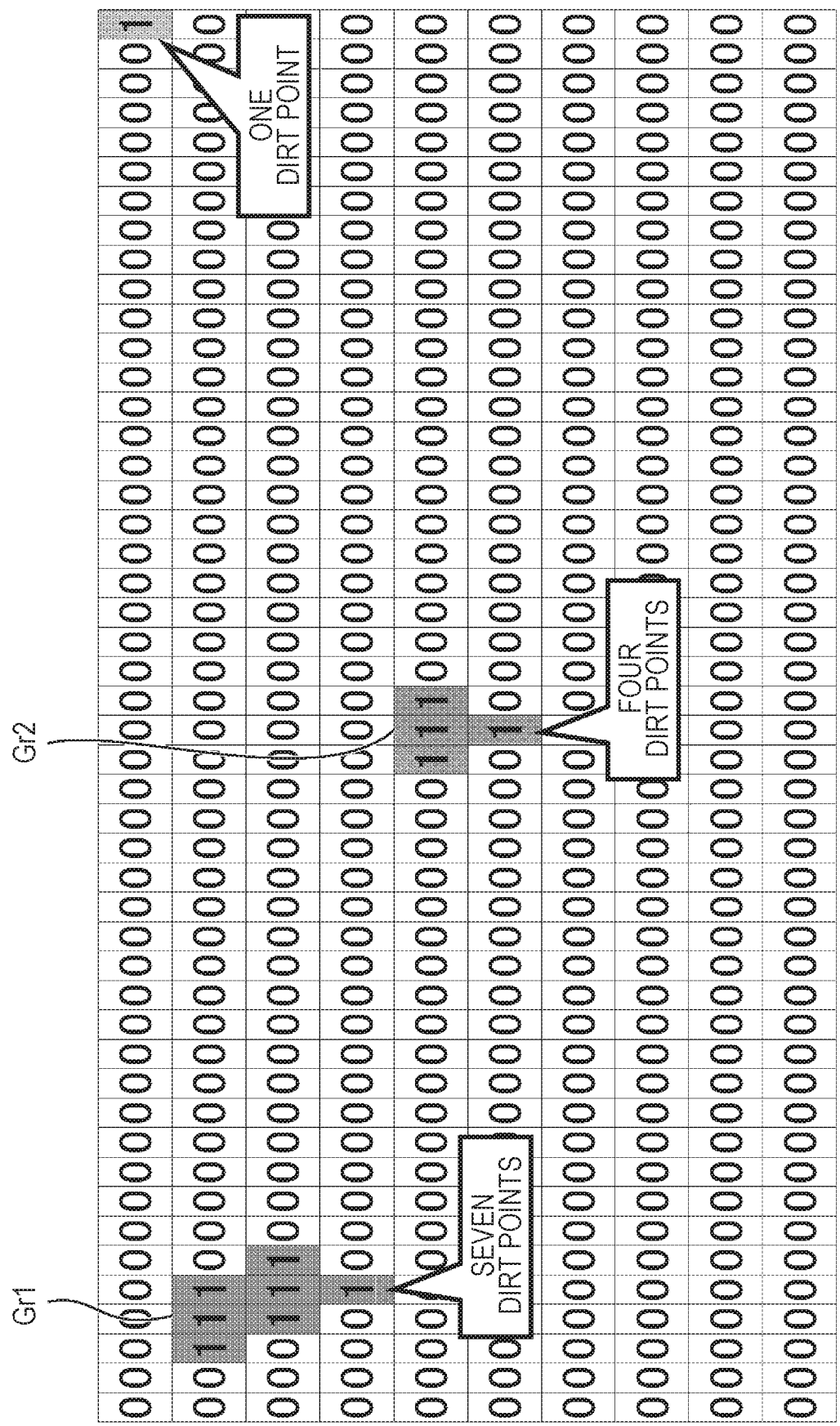
FIG. 10 is a diagram of exemplary dirt point groups acquired in the dirt determination processing illustrated in FIG. 9.

Next, the operation according to the second embodiment will be described. FIG. 9 is a flowchart of dirt determination processing of the objective sensor in the objective warning system according to the second embodiment. FIG. 10 is a diagram of exemplary dirt point groups acquired in the dirt determination processing illustrated in FIG. 9.

The objective warning system MB according to the second embodiment, is similar in operation to the objective warning system MA according to the first embodiment except that a set of dirt determination processing S21B to S26B in the operation illustrated in FIG. 9 is performed in the processing S2 in the operation illustrated in FIG. 3, instead of a set of dirt determination processing S21A to S26A in the operation illustrated in FIG. 4, and thus the description thereof will be omitted.

The dirt determination processing according to the second embodiment will be described below. In FIG. 9, the dirt candidate point extraction unit 34 performs extraction process of dirt candidate points (S21B) similarly to the processing S21A illustrated in FIG. 4, and the dirt point distribution operation unit 35 performs operation processing of dirt point distributions (S22B) similarly to the processing S22A illustrated in FIG. 4.

Next, the group extraction unit 361B of the dirt determination unit 36B groups, as the dirt point group Gr, the dirt points adjacent to each other from the dirt point distributions acquired by the dirt point distribution operation unit 35, and the second dirt volume operation unit 362B of the dirt determination unit 36B acquires, as the second dirt volume DV2, the total number of the dirt point having the area of the predetermined threshold area Tha or more and the dirt points grouped in the dirt point group having the area of the predetermined threshold area Tha or more, by the group extraction unit 361B, from the dirt point distributions acquired by the dirt point distribution operation unit 35 (S23B). In other words, the second dirt volume operation unit 362B regards even one dirt point as the dirt point group Gr, and acquires, as the second dirt volume DV2, the total number of the dirt points grouped in the dirt point group having the area of the predetermined threshold area Tha or more. For example, in the dirt point distributions illustrated in FIG. 6, as illustrated in FIG. 10, one dirt point is not grouped, seven dirt points adjacent to each other are grouped in a first group Gr1, and four dirt points adjacent to each other are grouped in a second group Gr2. Then, for example, in a case where the predetermined threshold area Tha is set between the area of one dirt point and the area of the dirt point group Gr grouping two dirt points, the second dirt volume DV2 satisfies the following expression: DV2=7+4=11. For example, in a case where the predetermined threshold area Tha is set between the area of the dirt point group Gr grouping four dirt points and the area of the dirt point group Gr grouping five dirt points, the second dirt volume DV2 satisfies the following expression: DV2=7. Note that the adjacent direction may be a lateral direction (the φ direction in a spherical coordinate system) or may be a longitudinal direction (the θ direction in the spherical coordinate system). For example, since no dirt points adjacent to each other are present in the dirt point distributions illustrated in FIG. 7, no group is present. Therefore, the second dirt volume DV2 satisfies the following expression: DV2=0. In this manner, the second dirt volume DV2 has different values on the basis of the local dirt and the discrete dirt. Thus, the local dirt and the discrete dirt are distinguished from each other with the second dirt volume DV2.

Next, the second determination unit 363B of the dirt determination unit 36B determines whether the second dirt volume DV2 acquired by the second dirt volume operation unit 362B is the second determination threshold value Thd2 or more (S24B). The second determination threshold value Thd2 is appropriately set on the basis of an experimental result of a plurality of samples.

On the basis of the determination result, in a case where the second dirt volume DV2 acquired by the second dirt volume operation unit 362B is the second determination threshold value Thd2 or more (Yes), the second determination unit 363B determines the presence of the dirt (S25B) and then completes the dirt determination processing S2.

On the basis of the determination result, in a case where the second dirt volume DV2 acquired by the second dirt volume operation unit 362B is less than the second determination threshold value Thd2 (No), the second determination unit 363B determines the absence of the dirt (S26B) and then completes the dirt determination processing S2.

As described above, the objective warning system MB, the object detection device DB, the objective sensor SB, and the objective sensor SB dirt determination method implemented therein according to the second embodiment, have functional effects similar to those of the objective warning system MA, the object detection device DA, the objective sensor SA, and the dirt determination method according to the first embodiment.

The objective warning system MB, the object detection device DB, the objective sensor SB, and the dirt determination method according to the second embodiment, acquire, as the second dirt volume DV2, the total number of the grouped dirt points so that the discrete dirt in which the dirt over a relatively small area, discretely adheres to the protective member over a relatively wide range and the local dirt in which the dirt over a relatively large area, relatively locally adheres to the protective member can be distinguished from each other. Thus, the determination precision of the presence or absence of the dirt can improve. Therefore, the objective warning system MB, the object detection device DB, the objective sensor SB, and the dirt determination method according to the second embodiment, are favorable in a case where the system M using the objective sensor SB and the object detection device DB, is a system in which the local dirt is an obstacle but the discrete dirt is not an obstacle, in order to achieve the purpose of the system M.

Next, a different embodiment will be described.

Third Embodiment

A third embodiment is favorably used in a case where each region has different priority in an irradiation range AR.

Figure 11:
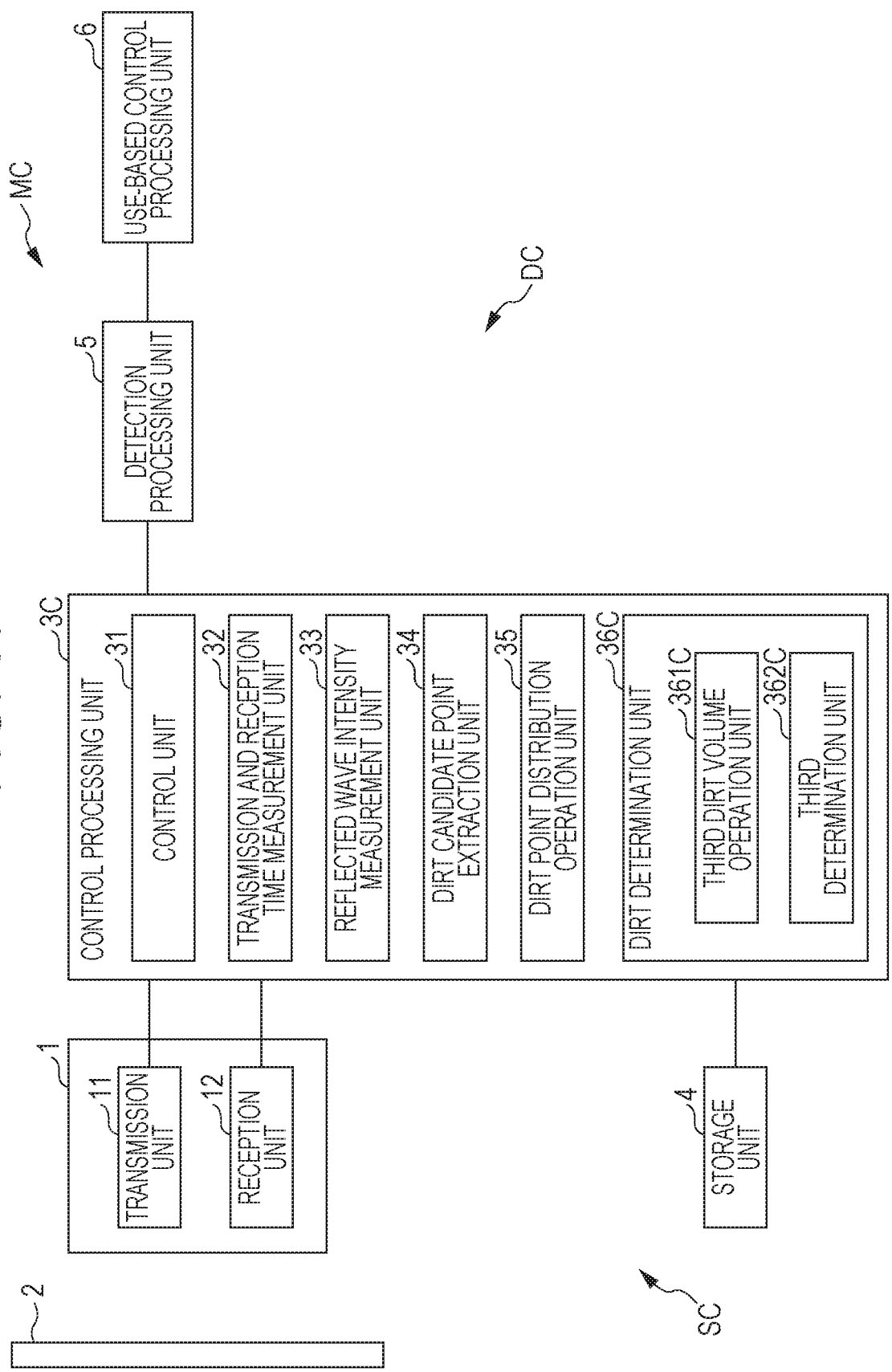
FIG. 11 is a diagram of the configuration of an objective warning system using an objective sensor and an object detection device according to a third embodiment.

FIG. 11 is a diagram of the configuration of an objective warning system using an objective sensor and an object detection device according to the third embodiment. The objective warning system MC according to the third embodiment, includes, for example, the object detection device DC and a use-based control processing unit 6 as illustrated in FIG. 11. The object detection device DC includes the objective sensor SC and a detection processing unit 5. The objective sensor SC includes a transmission and reception unit 1, a protective member 2, a control processing unit 3C, a storage unit 4, and a housing HG.

The use-based control processing unit 6 in the objective warning system MC according to the third embodiment, is similar to the use-based control processing unit 6 in the objective warning system MA according to the first embodiment, and thus the description thereof will be omitted. The detection processing unit 5 in the objective warning system MC according to the third embodiment, is similar to the detection processing unit 5 in the objective warning system MA according to the first embodiment, and thus the description thereof will be omitted. The transmission and reception unit 1, the protective member 2, the storage unit 4, and the housing HG in the objective sensor SC in the objective warning system MC according to the third embodiment, are similar to the transmission and reception unit 1, the protective member 2, the storage unit 4, and the housing HG in the objective sensor SA in the objective warning system MA according to the first embodiment, and thus the descriptions thereof will be omitted.

Similarly to the control processing unit 3A, the control processing unit 3C is connected to the transmission and reception unit 1, the storage unit 4, and the detection processing unit 5. The control processing unit 3C includes a circuit that controls each unit of the objective sensor SC in accordance with the function of each unit, transmits and receives transmission waves and reflected waves, respectively, determines the presence or absence of dirt on the protective member 2, and outputs at least either transmission and reception time or the intensity of each of the reflected waves in accordance with the determination result, to the detection processing unit 5. The control processing unit 3C functionally includes a control unit 31, a transmission and reception time measurement unit 32, a reflected wave intensity measurement unit 33, a dirt candidate point extraction unit 34, a dirt point distribution operation unit 35, and a dirt determination unit 36C, with execution of the control processing programs thereof.

The control unit 31, the transmission and reception time measurement unit 32, the reflected wave intensity measurement unit 33, the dirt candidate point extraction unit 34, and the dirt point distribution operation unit 35 in the control processing unit 3C according to the third embodiment, are similar to the control unit 31, the transmission and reception time measurement unit 32, the reflected wave intensity measurement unit 33, the dirt candidate point extraction unit 34, and the dirt point distribution operation unit 35 in the control processing unit 3A according to the first embodiment, respectively, and thus the descriptions thereof will be omitted.

The dirt determination unit 36C determines the presence or absence of the dirt on the protective member 2 on the basis of dirt point distributions acquired by the dirt point distribution operation unit 35. According to the third embodiment, the dirt determination unit 36C functionally includes: a third dirt volume operation unit 361C that acquires a third dirt volume DV3 weighted with a plurality of respective weights assigned to a plurality of measurement points on the basis of the dirt point distributions acquired by the dirt point distribution operation unit 35, and a third determination unit 362C that determines the presence of the dirt in a case where the third dirt volume DV3 acquired by the third dirt volume operation unit 361C is a third determination threshold value Thd3 or more.

More specifically, for example, according to a first aspect, the third dirt volume operation unit 361C acquires dirt points from the dirt point distributions acquired by the dirt point distribution operation unit 35, assigns "1" to each of the dirt points that have been acquired, and multiplies the assigned "1"s by the respective predetermined weights previously assigned to the measurement points corresponding to the dirt points that have been acquired. After that, the third dirt volume operation unit 361C makes an addition so as to acquire the third dirt volume DV3. For example, according to a second aspect, the third dirt volume operation unit 361C assigns "1" to each of dirt points grouped similarly to the grouping of the group extraction unit 361B described above, and multiplies the assigned "1"s by the respective predetermined weights previously assigned to the measurement points corresponding to the grouped dirt points. After that, the third dirt volume operation unit 361C makes an addition so as to acquire the third dirt volume DV3.

Figure 12:
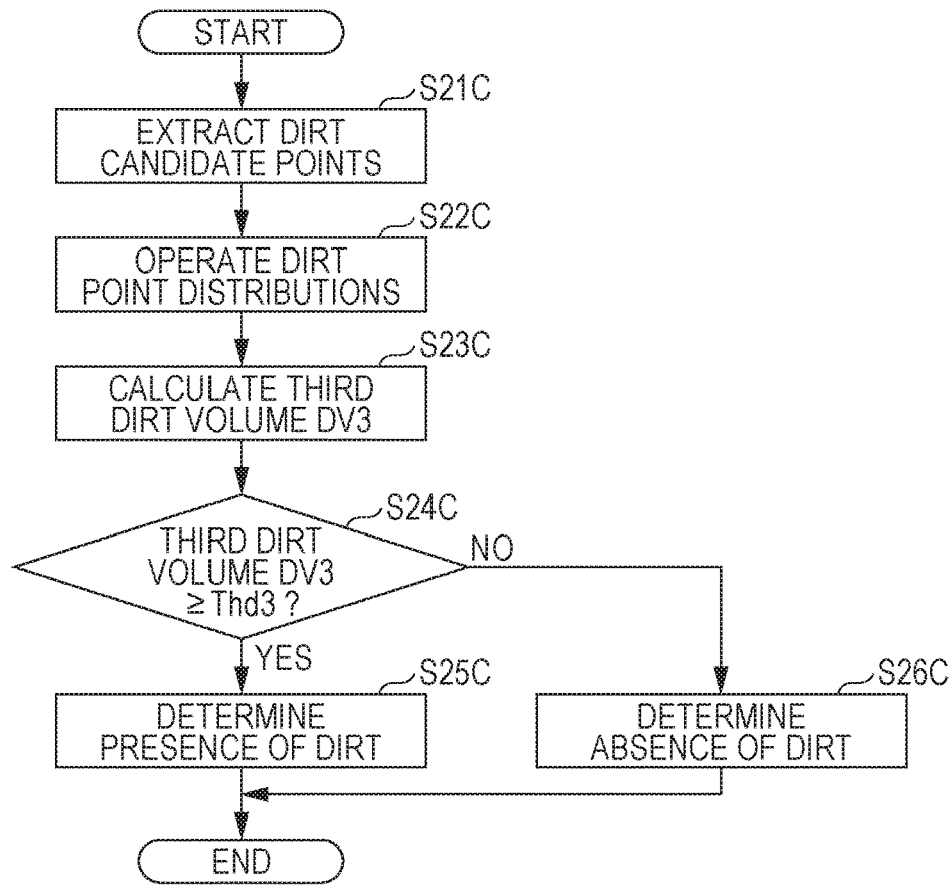
FIG. 12 is a flowchart of dirt determination processing of the objective sensor in the objective warning system according to the third embodiment.
Figure 13:
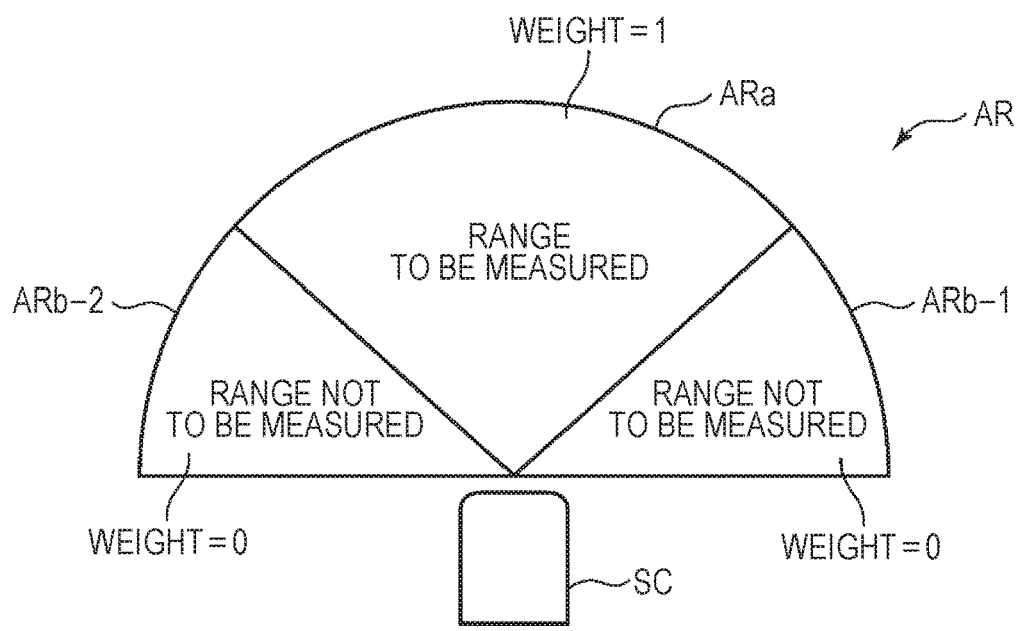
FIG. 13 is a diagram for describing the range to be measured of the objective sensor and weights for acquiring a third dirt volume in the objective warning system according to the third embodiment.

Next, the operation according to the third embodiment will be described. FIG. 12 is a flowchart of dirt determination processing of the objective sensor in the objective warning system according to the third embodiment. FIG. 13 is a diagram for describing the range to be measured of the objective sensor and the weights for acquiring the third dirt volume, in the objective warning system according to the third embodiment.

The objective warning system MC according to the third embodiment, is similar in operation to the objective warning system MA according to the first embodiment except that a set of dirt determination processing S21C to S26C in the operation illustrated in FIG. 12 is performed in the processing S2 in the operation illustrated in FIG. 3, instead of a set of dirt determination processing S21A to S26A in the operation illustrated in FIG. 4, and thus the description thereof will be omitted.

The dirt determination processing according to the third embodiment will be described below. In FIG. 12, the dirt candidate point extraction unit 34 performs extraction process of dirt candidate points (S21C) similarly to the processing S21A illustrated in FIG. 4, and the dirt point distribution operation unit 35 performs operation processing of dirt point distributions (S22C) similarly to the processing S22A illustrated in FIG. 4.

Next, the third dirt volume operation unit 361C of the dirt determination unit 36C acquires the third dirt volume DV3 weighted with the plurality of respective weights assigned to the plurality of measurement points on the basis of the dirt point distributions acquired by the dirt point distribution operation unit 35. For the plurality of respective weights assigned to the plurality of measurement points, for example, in a case where a part in the irradiation range AR is a range to be measured, the weight of the range to be measured, is set to a relatively large value, and the weights of the remaining ranges, except the range to be measured, in the irradiation range AR, each are set to a relatively small value. For example, as illustrated in FIG. 13, in a case where the range of an argument φ of ±45° is a range to be measured ARa in a spherical coordinate system in the irradiation range AR, and the range of an argument φ of −90° to −45° and the range of an argument φ=+45° to +90° are a range not to be measured ARb-1 and a range not to be measured ARb-2, respectively, in the spherical coordinate system in the irradiation range AR, a weight of "1" is assigned to each of the plurality of measurement points in the range to be measured ARa-1 and a weight of "0" is assigned to each of the plurality of measurement points in each of the ranges not to be measured ARb-1 and ARb-2. With such weighting, according to the first aspect, the third dirt volume operation unit 361C acquires the dirt points from the dirt point distributions acquired by the dirt point distribution operation unit 35, assigns "1" to each of the dirt points that have been acquired, and multiplies the assigned "1"s by the respective predetermined weights previously assigned to the measurement points corresponding to the dirt points that have been acquired. After that, the third dirt volume operation unit 361C makes an addition so as to acquire the third dirt volume DV3. According to the second aspect, the third dirt volume operation unit 361C assigns "1" to each of the dirt points grouped similarly to the grouping of the group extraction unit 361B described above, and multiplies the assigned "1"s by the respective predetermined weights previously assigned to the measurement points corresponding to the grouped dirt points. After that, the third dirt volume operation unit 361C makes an addition so as to acquire the third dirt volume DV3.

Next, the third determination unit 362C of the dirt determination unit 36C determines whether the third dirt volume DV3 acquired by the third dirt volume operation unit 361C is the third determination threshold value Thd3 or more (S24C). The third determination threshold value Thd3 is appropriately set on the basis of an experimental result of a plurality of samples. Note that, in a case where the third dirt volume operation unit 361C acquires the third dirt volume DV3 according to the first aspect, the third determination threshold value Thd3 is set to an appropriate value in accordance therewith. In a case where the third dirt volume operation unit 361C acquires the third dirt volume DV3 according to the second aspect, the third determination threshold value Thd3 is set to an appropriate value in accordance therewith.

On the basis of the determination result, the third dirt volume DV3 acquired by the third dirt volume operation unit 361C is the third determination threshold value Thd3 or more (Yes), the third determination unit 362C determines the presence of the dirt (S25C) and then completes the dirt determination processing S2.

On the basis of the determination result, in a case where the third dirt volume DV3 acquired by the third dirt volume operation unit 361C is less than the third determination threshold value Thd3 (No), the third determination unit 362C determines the absence of the dirt (S26C), and then completes the dirt determination processing S2.

As described above, the objective warning system MC, the object detection device DC, the objective sensor SC, and the objective sensor SC dirt determination method implemented therein according to the third embodiment, have functional effects similar to those of the objective warning system MA, the object detection device DA, the objective sensor SA, and the dirt determination method according to the first embodiment.

The objective warning system MC, the object detection device DC, the objective sensor SC, and the dirt determination method according to the third embodiment can determine the presence or absence of the dirt in only a particular range in the plurality of measurement points, with the plurality of respective weights assigned to the plurality of measurement points, set to appropriate values. For example, due to a cause, such as the wind constantly blowing in a particular direction at a site at which the objective sensor SC has been installed, only the edge portion of the protective member 2 locally easily becomes dirty. In a case where the range to be measured is, for example, a range different from the portion to be easily dirty, such as a region close to the center at an angle of horizontal view, unnecessary dirt determination arising from dirt out of the range to be measured, can be excluded.

Note that, according to the first to third embodiments described above, the objective sensors SA, SB, and SC and the object detection devices DA, DB, and DC are used in the objective warning systems MA, MB, and MC, respectively, but are not limited to these. The objective sensors SA, SB, and SC and the object detection devices DA, DB, and DC according to the first to third embodiments, respectively, can be used in a system for an appropriate use. For example, the sensors and the devices can be used in a collision avoidance system for preventing a vehicle from colliding against an object. In this case, in a case where the direction expressed by the measurement point information output from the detection processing unit 5, faces forward, the use-based control processing unit 6 controls the vehicle to decelerate in accordance with the distance output from the detection processing unit 5. In a case where the distance output from the detection processing unit 5 is equivalent to or less than a collision avoidance distance Thc1 that has been previously set, the use-based control processing unit 6 controls the vehicle to stop.

According to the first to third embodiments described above, the extraction of the dirt candidate points in each piece of processing S21A, S21B, and S21C, and the operation of the dirt point distributions in each piece of processing S22A, S22B, and S22C, are performed to all the directions (all the measurement points) in the irradiation range AR, but may be performed to part of the directions (part of the measurement points) in the irradiation range AR, for example, within a range to be easily dirty or within a range in which high reliability is required for a sensing result.

The present specification discloses the techniques according to the various aspects as described above, and main techniques therein will be summarized below.

An objective sensor according to one aspect, includes: a transmission and reception unit configured to individually transmit predetermined transmission waves in a plurality of mutually different directions and receive a plurality of respective reflected waves based on the plurality of transmission waves; a protective member formed of a material through which the transmission waves and the reflected waves pass, the protective member protecting the transmission and reception unit; a transmission and reception time measurement unit configured to measure, with the plurality of directions as a plurality of measurement points, for each of the plurality of measurement points, a transmission and reception time from a transmission time of the transmission wave relating to each of the measurement points to a reception time of the reflected wave based on the transmission wave; a reflected wave intensity measurement unit configured to measure, for each of the plurality of measurement points, intensity of the reflected wave based on the transmission wave relating to each of the measurement points; a dirt candidate point extraction unit configured to extract, as dirt candidate points, from the plurality of measurement points, the measurement points each having the transmission and reception time measured by the transmission and reception time measurement unit, shorter than a first threshold time, and the intensity measured by the reflected wave intensity measurement unit, equivalent to or more than threshold intensity; a dirt point distribution operation unit configured to extract, as dirt points, from the dirt candidate points extracted by the dirt candidate point extraction unit, the dirt candidate points each extracted continuously for a second threshold time or more at the same measurement point at mutually different times, so as to acquire dirt point distributions for the plurality of measurement points; and a dirt determination unit configured to determine presence or absence of dirt on the protective member, based on the dirt point distributions acquired by the dirt point distribution operation unit.

Such an objective sensor first extracts, as the dirt candidate points, the measurement points each having the transmission and reception time shorter than the first threshold time and the intensity equivalent to or more than the threshold intensity, regards the dirt candidate points that have been extracted, as the dirt points, in a case where the dirt candidate points continue for the predetermined second threshold time that has been previously set, or more, acquires the dirt point distributions on the basis of the dirt points, and determines the presence or absence of the dirt on the protective member, on the basis of the dirt point distributions that have been acquired, instead of determining the presence or absence of the dirt simply on the conditions that the transmission and reception time is shorter than the first threshold time and the intensity is the threshold intensity or more. Thus, the objective sensor can determine the dirt more precisely.

In the objective sensor described above according to a different aspect, the dirt determination unit includes: a first dirt volume operation unit configured to acquire, as a first dirt volume, the total number of the dirt points from the dirt point distributions acquired by the dirt point distribution operation unit; and a first determination unit configured to determine the presence of the dirt in a case where the first dirt volume acquired by the first dirt volume operation unit is a first determination threshold value or more.

Such an objective sensor can quantify, as the first dirt volume, the dirt volume expressing the degree of the dirt, with the simple technique of acquiring the total number of the dirt points.

In the objective sensor described above according to a different aspect, the dirt determination unit includes: a group extraction unit configured to group, as a dirt point group, dirt points adjacent to each other from the dirt point distributions acquired by the dirt point distribution operation unit; a second dirt volume operation unit configured to acquire, as a second dirt volume, the total number of a dirt point having an area of a predetermined threshold area or more and the dirt points grouped in the dirt point group having the area of the predetermined threshold area or more; and a second determination unit configured to determine the presence of the dirt in a case where the second dirt volume acquired by the second dirt volume operation unit is a second determination threshold value or more.

Such an objective sensor acquires, as the second dirt volume, the total number of the dirt point having the area of the predetermined threshold area or more and the dirt points grouped in the dirt point group having the area of the predetermined threshold area or more, so as to be able to distinguish between a case where the dirt over a relatively small area discretely adheres to the protective member over a relatively large range and a case where the dirt over a relatively large area relatively locally adheres to the protective member, so that the determination precision of the presence or absence of the dirt can improve.

In the objective sensor described above according to a different aspect, the dirt determination unit includes: a third dirt volume operation unit configured to acquire a third dirt volume weighted with a plurality of respective weights assigned to the plurality of measurement points based on the dirt point distributions acquired by the dirt point distribution operation unit; and a third determination unit configured to determine the presence of the dirt in a case where the third dirt volume acquired by the third dirt volume operation unit is a third determination threshold value or more. Preferably, the third dirt volume operation unit acquires the dirt points from the dirt point distributions acquired by the dirt point distribution operation unit, assigns "1" to each of the dirt points that have been acquired, and multiplies the assigned "1"s by the respective predetermined weights previously assigned to the measurement points corresponding to the dirt points that have been acquired. After that, the third dirt volume operation unit makes an addition so as to acquire the third dirt volume. Preferably, the third dirt volume operation unit assigns "1" to each of the dirt points grouped by the group extraction unit, and multiplies the assigned "1"s by the respective predetermined weights previously assigned to the measurement points corresponding to the dirt points grouped by the group extraction unit. After that, the third dirt volume operation unit makes an addition so as to acquire the third dirt volume.

Such an objective sensor can determine the presence or absence of the dirt in only a particular range in the plurality of measurement points, with the plurality of respective weights assigned to the plurality of measurement points, set to appropriate values.

According to a different aspect, an objective sensor dirt determination method of determining presence or absence of dirt on a protective member in an objective sensor including: a transmission and reception unit configured to individually transmit predetermined transmission waves in a plurality of mutually different directions and receive a plurality of respective reflected waves based on the plurality of transmission waves; and the protective member formed of a material through which the transmission waves and the reflected waves pass, the protective member protecting the transmission and reception unit, includes: a transmission and reception time measurement step of measuring, with the plurality of directions as a plurality of measurement points, for each of the plurality of measurement points, a transmission and reception time from a transmission time of the transmission wave relating to each of the measurement points to a reception time of the reflected wave based on the transmission wave; a reflected wave intensity measurement step of measuring, for each of the plurality of measurement points, intensity of the reflected wave based on the transmission wave relating to each of the measurement points; a dirt candidate point extraction step of extracting, as dirt candidate points, from the plurality of measurement points, the measurement points each having the transmission and reception time measured by the transmission and reception time measurement step, shorter than a first threshold time, and the intensity measured by the reflected wave intensity measurement step, equivalent to or more than threshold intensity; a dirt point distribution operation step of extracting, as dirt points, from the dirt candidate points extracted by the dirt candidate point extraction step, the dirt candidate points each extracted continuously for a second threshold time or more at the same measurement point at mutually different times, so as to acquire dirt point distributions for the plurality of measurement points; and a dirt determination step of determining the presence of the dirt on the protective member based on the dirt point distributions acquired by the dirt point distribution operation step.

Such an objective sensor dirt determination method, first extracts, as the dirt candidate points, the measurement points each having the transmission and reception time shorter than the first threshold time and the intensity equivalent to or more than the threshold intensity, regards the dirt candidate points that have been extracted, as the dirt points, in a case where the dirt candidate points continue for the predetermined second threshold time that has been previously set, or more, acquires the dirt point distributions on the basis of the dirt points, and determines the presence or absence of the dirt on the protective member, on the basis of the dirt point distributions that have been acquired, instead of determining the presence or absence of the dirt simply on the conditions that the transmission and reception time is shorter than the first threshold time and the intensity is the threshold intensity or more. Thus, the objective sensor dirt determination method can determine the dirt more precisely.

According to a different aspect, an object detection device includes: any one of the objective sensors described above;

and a detection processing unit configured to perform at least either detection of an object and ranging of measuring a distance to the object, based on at least either the transmission time measured by the transmission and reception time measurement unit or the intensity measured by the reflected wave intensity measurement unit, for each of the plurality of measurement points.

Since having any one of the objective sensors described above, such an object detection device can determine the dirt more precisely. Thus, the object detection device can perform at least either the detection of the object or the ranging of measuring the distance to the object, more precisely.

The application is based on Japanese Patent Application No. 2015-126708 filed on Jun. 24, 2015, and the details thereof are included in the present application.

In order to express the present invention, the present invention has been appropriately and sufficiently described above through the embodiments with reference to the drawings. It should be recognized that a person skilled in the art may easily at least alter or improve the embodiments described above. Therefore, as long as the alterations or improvements performed by the person skilled in the art do not depart from the scope of the claims described in the claims, the alterations or the improvements are interpreted to be included in the scope of the claims.

INDUSTRIAL APPLICABILITY

According to the present invention, the objective sensor, the objective sensor dirt determination method, and the object detection device can be provided.

The invention claimed is:

1. An objective sensor comprising:
a transceiver that individually transmits predetermined transmission waves in a plurality of mutually different directions and receive a plurality of respective reflected waves based on the plurality of transmission waves;
a protective member formed of a material through which the transmission waves and the reflected waves pass, the protective member protecting the transceiver;
a transmission and reception time measurer that measures, with the plurality of directions as a plurality of measurement points, for each of the plurality of measurement points, a transmission and reception time duration from a transmission time of the transmission wave relating to each of the measurement points to a reception time of the reflected wave based on the transmission wave;
a reflected wave intensity measurer that measures for each of the plurality of measurement points, intensity of the reflected wave based on the transmission wave relating to each of the measurement points;
a dirt candidate point extractor that extracts, as dirt candidate points, from the plurality of measurement points, the measurement points each having the transmission and reception time duration measured by the transmission and reception time measurer, shorter than a first threshold time, and the intensity measured by the reflected wave intensity measurer, equivalent to or more than a threshold intensity;
a dirt point distribution operation part that extracts, as dirt points, from the dirt candidate points extracted by the dirt candidate point extractor, the dirt candidate points each extracted continuously for a second threshold time or more at the same measurement point at mutually different times, so as to acquire dirt point distributions for the plurality of measurement points; and
a dirt determiner that determines presence or absence of dirt on the protective member, based on the dirt point distributions acquired by the dirt point distribution operation part.

2. The objective sensor according to claim 1,
wherein the dirt determiner includes:
a first dirt volume operation part that acquires, as a first dirt volume, a total number of the dirt points from the dirt point distributions acquired by the dirt point distribution operation part; and
a first determiner that determines the presence of the dirt in a case where the first dirt volume acquired by the first dirt volume operation part is a first determination threshold value or more.

3. The objective sensor according to claim 2,
wherein the dirt determiner includes:
a group extractor that groups, as a dirt point group, dirt points adjacent to each other from the dirt point distributions acquired by the dirt point distribution operation part;
a second dirt volume operation part that acquires, as a second dirt volume, a total number of a dirt point having an area of a predetermined threshold area or more and the dirt points grouped in the dirt point group having the area of the predetermined threshold area or more; and
a second determiner that determines the presence of the dirt in a case where the second dirt volume acquired by the second dirt volume operation part is a second determination threshold value or more.

4. The objective sensor according to claim 3,
wherein the dirt determiner includes:
a third dirt volume operation part that acquires a third dirt volume weighted with a plurality of respective weights assigned to the plurality of measurement points based on the dirt point distributions acquired by the dirt point distribution operation part; and
a third determiner that determines the presence of the dirt in a case where the third dirt volume acquired by the third dirt volume operation part is a third determination threshold value or more.

5. An object detection device comprising:
the objective sensor according claim 4; and
a detection processor that performs at least either detection of an object and ranging of measuring a distance to the object, based on at least either the transmission and reception time duration measured by the transmission and reception time measurer or the intensity measured by the reflected wave intensity measurer, for each of the plurality of measurement points.

6. An object detection device comprising:
the objective sensor according to claim 3; and
a detection processor that performs at least either detection of an object and ranging of measuring a distance to the object, based on at least either the transmission and reception time duration measured by the transmission and reception time measurer or the intensity measured by the reflected wave intensity measurer, for each of the plurality of measurement points.

7. An object detection device comprising:
the objective sensor according to claim 2; and
a detection processor that performs at least either detection of an object and ranging of measuring a distance to the object, based on at least either the transmission and reception time duration measured by the transmission and reception time measurer or the intensity measured by the reflected wave intensity measurer, for each of the plurality of measurement points.

8. An object detection device comprising:
the objective sensor according to claim 1; and
a detection processor that performs at least either detection of an object and ranging of measuring a distance to the object, based on at least either the transmission and reception time duration measured by the transmission and reception time measurer or the intensity measured by the reflected wave intensity measurer, for each of the plurality of measurement points.

9. An objective sensor dirt determination method of determining presence or absence of dirt on a protective member in an objective sensor including: a transceiver that individually transmits predetermined transmission waves in a plurality of mutually different directions and receive a plurality of respective reflected waves based on the plurality of transmission waves; and the protective member formed of a material through which the transmission waves and the reflected waves pass, the protective member protecting the transceiver, the objective sensor dirt determination method comprising:
    measuring, with the plurality of directions as a plurality of measurement points, for each of the plurality of measurement points, a transmission and reception time duration from a transmission time of the transmission wave relating to each of the measurement points to a reception time of the reflected wave based on the transmission wave;
    measuring, for each of the plurality of measurement points, intensity of the reflected wave based on the transmission wave relating to each of the measurement points;
    extracting, as dirt candidate points, from the plurality of measurement points, the measurement points each having the transmission and reception time duration measured by the measuring of the transmission and reception time duration, shorter than a first threshold time, and the intensity measured by the measuring of the intensity, equivalent to or more than a threshold intensity;
    extracting, as dirt points, from the dirt candidate points extracted by the extracting, the dirt candidate points each extracted continuously for a second threshold time or more at the same measurement point at mutually different times, so as to acquire dirt point distributions for the plurality of measurement points; and
    determining the presence of the dirt on the protective member based on the dirt point distributions acquired by the extracting of the dirt candidate points so as to acquire the dirt point distributions.

* * * * *